US010135658B2

(12) United States Patent
Nory et al.

(10) Patent No.: US 10,135,658 B2
(45) Date of Patent: Nov. 20, 2018

(54) METHOD AND APPARATUS FOR RECEPTION OF CONTROL SIGNALING

(71) Applicant: Motorola Mobility LLC, Chicago, IL (US)

(72) Inventors: Ravikiran Nory, Buffalo Grove, IL (US); Vijay Nangia, Woodridge, IL (US); Ajit Nimbalker, Santa Clara, CA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/784,038

(22) Filed: Oct. 13, 2017

(65) Prior Publication Data

US 2018/0054342 A1 Feb. 22, 2018

Related U.S. Application Data

(60) Continuation of application No. 15/482,626, filed on Apr. 7, 2017, which is a division of application No.
(Continued)

(51) Int. Cl.
*H04K 1/10* (2006.01)
*H04L 27/26* (2006.01)
(Continued)

(52) U.S. Cl.
CPC ........ *H04L 27/2647* (2013.01); *H04L 5/0051* (2013.01); *H04L 5/0053* (2013.01);
(Continued)

(58) Field of Classification Search
CPC ............... H04L 27/2647; H04L 5/0007; H04L 27/2657; H04L 27/2662; H04L 5/0048;
(Continued)

(56) References Cited

U.S. PATENT DOCUMENTS

2004/0086195 A1 5/2004 Ziliani
2012/0176987 A1 7/2012 Kaminski
(Continued)

FOREIGN PATENT DOCUMENTS

WO 2013131268 A1 9/2013
WO 2015190883 A1 12/2015

OTHER PUBLICATIONS

Motorola Mobility, "PDSCH Transmission options for LAA," R1-157214, 3GPP TSG RAN WG1#83, Nov. 15-22, 2015, Anaheim, USA.
(Continued)

*Primary Examiner* — Zewdu Kassa
(74) *Attorney, Agent, or Firm* — Matthew C. Loppnow; The Watson I.P. Group, PLC

(57) ABSTRACT

A method and apparatus provide reception of control signaling in a wireless communication network. A preamble transmission can be detected from a second device in a first set of at least one Orthogonal Frequency Division Multiplexing (OFDM) symbol starting with a first OFDM symbol in a subframe received on a secondary serving cell operating on an unlicensed carrier, the first OFDM symbol having a first Cyclic Prefix (CP). A second OFDM symbol in the subframe can be determined such that the second OFDM symbol immediately follows the first set of OFDM symbols. Downlink Control Information (DCI) containing a Physical Downlink Shared Channel (PDSCH) resource assignment can be decoded in a second set of OFDM symbols beginning with the second OFDM symbol, the second set of OFDM symbols having a second CP. The duration of the first CP is larger than the duration of the second CP.

20 Claims, 7 Drawing Sheets

Related U.S. Application Data

15/012,162, filed on Feb. 1, 2016, now Pat. No. 9,647,864.

(60) Provisional application No. 62/146,020, filed on Apr. 10, 2015.

(51) Int. Cl.
*H04L 5/00* (2006.01)
*H04W 16/14* (2009.01)
*H04W 72/04* (2009.01)

(52) U.S. Cl.
CPC ...... *H04L 27/2602* (2013.01); *H04L 27/2607* (2013.01); *H04L 27/2613* (2013.01); *H04L 27/2662* (2013.01); *H04W 16/14* (2013.01); *H04W 72/042* (2013.01)

(58) Field of Classification Search
CPC . H04L 25/4902; H04L 1/0009; H04L 1/0041; H04L 25/49; H04L 1/0003; H04L 1/0071; H04L 27/0008; H04B 3/54
USPC .......................... 375/260, 259, 295, 316, 219
See application file for complete search history.

(56) References Cited

U.S. PATENT DOCUMENTS

| | | |
|---|---|---|
| 2013/0315152 A1 | 11/2013 | Ratasuk |
| 2015/0049741 A1* | 2/2015 | Chen .................. H04W 48/12 370/336 |
| 2015/0208396 A1 | 7/2015 | Guan |
| 2015/0256303 A1 | 9/2015 | Belghoul |
| 2015/0223208 A1 | 10/2015 | Park |
| 2015/0282134 A1 | 10/2015 | Suzuki |
| 2015/0304993 A1 | 10/2015 | Shimezawa |
| 2016/0174259 A1 | 6/2016 | Mukherjee |
| 2016/0278054 A1 | 9/2016 | You |
| 2016/0338048 A1 | 11/2016 | Alba |
| 2017/0127414 A1 | 5/2017 | Yi |
| 2017/0245156 A1 | 8/2017 | Gou |

OTHER PUBLICATIONS

LG Electronics, "Starting partial TTI structure in LAA," R1-156863, 3GPP TSG RAN WG1 meeting #83, Anaheim, USA, Nov. 15-22, 2015.

LG Electronics, "Ending partial TTI structure in LAA," R1-156864, 3GPP TSG RAN WG1 meeting #83, Anaheim, USA, Nov. 15-22, 2015.

May, PCT International Search Report, International application No. PCT/US2016/067702, European Patent Office, dated Feb. 17, 2017, Rijswijk, NL.

Qualcomm, "Way Forward on Subframe Structure, Numerology and System Bandwidth for LAA," R1-145380, 3GPP TSG RAN WG1 #79, San Francisco, USA, Nov. 17-21, 2014.

Intel Corporation, "Extended Subframes and (e)PDCCH for LAA downlink," R1-150090, 3GPP TSG RAN WG1 Meeting #80, Athens, Greece, Feb. 9-13, 2015.

Huawei, "Preamble for Licensed Assisted Access," R1-150985, 3GPP TSG RAN WG1 Ad-hoc Meeting, Paris, France, Mar. 24-26, 2015.

Panasonic, "Discussion on flexible transmission time in LAA," R1-151017, 3GPP TSG RAN WG1 Ad-hoc Meeting, Paris, France, Mar. 24-26, 2015.

Bechir Nsiri, "Performance evaluation of downlink LTE system," 2014 1st International Conference on Advanced Technologies for Signal and Image Processing (ATSIP), IEEE, Mar. 17, 2014.

Moreno, PCT International Search Report, International application No. PCT/US2016/022259, European Patent Office, dated Jun. 17, 2016, Rijswijk, NL.

Motorola Mobility, "UE operation for DL and DL+UL reception for LAA," R1-154592, 3GPP TSG RAN WG1#82, Aug. 24-28, 2015, Beijing, China.

Motorola Mobility, "Further details on UE operation and related signalling for LAA," R1-157215, 3GPP TSG RAN WG1#83, Nov. 15-22, 2015, Anaheim, USA.

Courville, PCT International Search Report, International application No. PCT/US2016/067696, European Patent Office, dated Mar. 4, 2017, Rijswijk, NL.

Kassa, Zewdu, Notice of References Cited, PTO-892, U.S. Appl. No. 15/012,232, filed Dec. 29, 2016, U.S. Patent and Trademark Office.

Hailu, PTO-892, Notice of References Cited, U.S. Appl. No. 15/012,199, U.S. Patent and Trademark Office, filed Feb. 8, 2018.

Kassa, Notice of References Cited, PTO-892, U.S. Appl. No. 15/012,232, U.S. Patent and Trademark Office, filed Nov. 17, 2017.

Kassa, Notice of References Cited, PTO-892, U.S. Appl. No. 15/012,162, U.S. Patent and Trademark Office, filed Sep. 13, 2016.

Kassa, Notice of References Cited, PTO-892, U.S. Appl. No. 15/482,626, U.S. Patent and Trademark Office, filed Jun. 21, 2017.

Kassa, Zewdu, Notice of References Cited, PTO-892, U.S. Appl. No. 15/012,232, filed Jul. 12, 2017, U.S. Patent and Trademark Office.

* cited by examiner

METHOD AND APPARATUS FOR RECEPTION OF CONTROL SIGNALING

BACKGROUND

1. Field

The present disclosure is directed to a method and apparatus for reception of control signaling. More particularly, the present disclosure is directed to a method and apparatus for reception of control signaling at a first wireless communication device from a second wireless communication device on a wireless network.

2. Introduction

Presently, users use portable devices, otherwise known as User Equipment (UE), such as smartphones, cell phones, tablet computers, selective call receivers, and other wireless communication devices, on Long Term Evolution (LTE) networks. Users use the UEs to download files, music, e-mail messages, and other data, as well as to watch streaming video, play streaming music, play games, surf the web, and engage in other data intensive activities. Because of large amounts of downloaded data as well as large amounts of users, LTE operators can now use unlicensed spectrum to complement the bandwidth of their LTE networks to provide faster data to users. This allows the users to download data faster on their portable devices. For example, unlicensed spectrum can include spectrum at 5 GHz (e.g. used by WiFi) and other unlicensed spectrum. LTE technology can be deployed in unlicensed spectrum using the carrier aggregation framework where a primary cell uses licensed spectrum, and a secondary cell is deployed in the unlicensed spectrum. Transmissions on the unlicensed carrier frequency typically have to follow Discontinuous Transmission requirements (DCT requirements) due to regulatory requirements and due the need to co-exist with other wireless systems operating in the same spectrum, such as Wi-Fi systems, LTE devices, such as UE's, and base stations, such as Enhanced Node-B's (eNBs). In some regulations, a LTE device may also be required to perform listen-before-talk (LBT) prior to transmitting on a carrier. If the device finds that the channel is busy, then it should defer its transmission until the carrier become clear.

If a first device, such as a UE is configured with a Scell operating on unlicensed spectrum, in order to receive and decode information from physical layer signals and channels from a second device in a particular subframe on that Scell, the first device may have to take into account whether the second device has any transmissions in that subframe; and if there are transmissions, whether the transmissions in that subframe are truncated; and if the transmissions are truncated, the location of those transmissions, such as the stating or ending Frequency Division Multiplexing (OFDM) symbol of the transmission(s), within that subframe. Unfortunately, present devices do not adequately provide for reception of control signaling in such a system. Thus, there is a need for a method and apparatus for improved reception of control signaling in a wireless communication network.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments can provide for a method and apparatus reception of control signaling in a wireless communication network. According to a possible embodiment, a first device can communicate with a second device using a primary serving cell (Pcell) operating on a licensed carrier and a secondary serving cell (Scell) operating on an unlicensed carrier. A preamble transmission can be detected from the second device in a first set of at least one Orthogonal Frequency Division Multiplexing (OFDM) symbol starting with a first OFDM symbol in a subframe received on the Scell. The first OFDM symbol can have a first Cyclic Prefix (CP). A second OFDM symbol in the subframe can be determined such that the second OFDM symbol immediately follows the first set of OFDM symbols. Downlink Control Information (DCI) containing a Physical Downlink Shared Channel (PDSCH) resource assignment can be decoded in a second set of OFDM symbols beginning with the second OFDM symbol. The second set of OFDM symbols can have a second CP. The duration of the first CP can be larger than the duration of the second CP.

According to another possible embodiment, a first set of a first number ($k1$) of control channel Blind Decoding (BD) candidates can be monitored by a device in a first subframe at an aggregation level for a control channel transmission in the first subframe starting from a first OFDM symbol position ($s1$) in the first subframe. A second set of a second number ($k2$) of control channel BD candidates can be monitored in the first subframe at the aggregation level for a control channel transmission in the first subframe starting from a second OFDM symbol ($s2$) position in the first subframe. A third set of a third number ($k3$) of control channel BD candidates can be monitored in a second subframe at the aggregation level for a control channel transmission in the second subframe starting only from a first OFDM symbol position ($s1$) in the second subframe when a Downlink Control Information (DCI) intended for the device is successfully decoded from a candidate in the second set of the second number ($k2$) of control channel BD candidates, where $k3 > k1$ and $k3 > k2$. The first OFDM symbol position ($s1$) in the first subframe can be the same position as the first OFDM symbol position ($s1$) in the second subframe. In one example, $k1=3$, $k2=3$, and $k3=6$. The values for the control channel blind decoding candidates can also vary depending on the type of control channel (e.g. PDCCH or EPDCCH).

According to another possible embodiment, Downlink Control Information (DCI) containing PDSCH resource assignment(s) can be received in one of two types of control channels in a subframe. A type of truncation of the subframe can be determined based on the type of control channel on which the DCI is received. The PDSCH can be decoded based on at least the determined type of truncation of the subframe.

Figure 1:
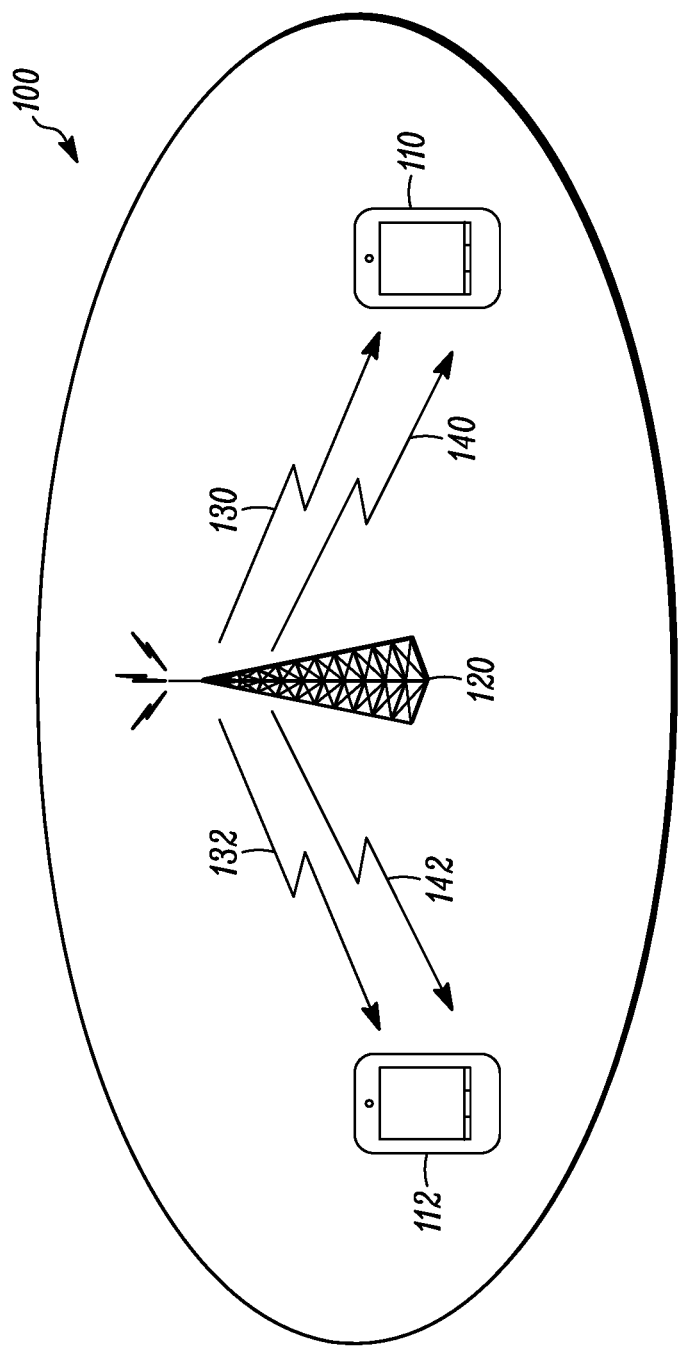
FIG. 1 is an example block diagram of a system according to a possible embodiment.

FIG. 1 is an example illustration of a system 100 according to a possible embodiment. The system 100 can include a first device 110 and a second device 120. While the first device 110 is illustrated as a User Equipment (UE) and the second device 120 is illustrated as a base station, such as an Enhanced Node-B (eNB), the roles may also be reversed. Furthermore, the devices 110 and 120 can be the same type of device, such as UE's or base stations, and can be any other type of device that can send and receive wireless communication signals. For illustrative purposes in some embodiments, the first device will be referred to as a UE and the second device 120 will be referred to as a base station, but it is understood that the first device 110 and the second device 120 can be any transmitting and/or receiving devices in all of the embodiments. The first device 110 and the second device 120 can communicate on different cells 130 and 140. The cell 130 can be a first cell, such as a primary serving cell (Pcell) and the first device 110 can be connected to the primary cell. The cell 140 can be a second cell, such as a secondary cell (Scell). The second cell 140 can also be a cell that operates on unlicensed spectrum. The cells 130 and 140 can further be cells associated with other base stations, can be a macro cells, can be small cells, can be pico cells, can be micro cells, can be femto cells, and/or can be any other cells useful for operation with a LTE network. The system 100 can also include a another device 112 that can communicate with the second device 120 on cells 132 and 142 in a similar manner to the first device 110. The devices 110 and 112 can be any devices that can access a wireless network. For example, the devices 110 and 112 can be UE's, such as wireless terminals, portable wireless communication devices, stationary wireless communication devices, smart-phones, cellular telephones, flip phones, personal digital assistants, personal computers having cellular network access cards, selective call receivers, tablet computers, or any other device that is capable of operating on a wireless network. In operation, the first device 110 can communicate with the second device 120 using the Pcell 130 operating on a licensed carrier and the Scell 140 operating on an unlicensed carrier.

For example, Third Generation Partnership Project (3GPP) LTE Releases 10-12 for Carrier Aggregation (CA) or dual connectivity, may allow an eNB to configure an Scell, such as a secondary carrier or a secondary Component Carrier (CC), to provide additional frequency resources for communication to a UE in addition to a Pcell. A Scell can operate via a CA mechanism, but some of the procedures identified for CA can also be reused for dual connectivity, such as when the Scell and Pcell belong to different cell groups.

Due to regulatory requirements, and due the need to co-exist with other wireless systems, such as Wi-Fi, cordless phones, wireless local area networks, and other wireless systems, LTE devices, such as UE's and eNB's, can take different issues into account while operating on an unlicensed carrier. For example, LTE devices typically have to check whether the carrier is busy by using some form of Listen Before Talk (LBT) mechanism before transmitting on an unlicensed carrier. A LTE device can then begin transmissions only if the carrier is free. LBT typically includes measuring the energy on the carrier, sometimes referred to as sensing, for a short duration, such as 9 us or 20 us, and determining whether the measured energy is less than a threshold, such as −82 dBm or −62 dBm. If the energy is less than the threshold, the carrier is determined to be free. Some examples of LBT include Clear Channel Assessment-Energy Detect (CCA-ED) and Clear Channel Assessment-Carrier Sense (CCA-CS) mechanisms defined in IEEE 802.11 specifications, CCA mechanisms specified in ETSI EN 301 893 specification, and other forms of LBT. As another example, transmissions on the carrier typically also have to follow Discontinuous Transmission (DCT) requirements. For example, the LTE device can continuously transmit for X ms, such as where X can be 4 for some regulations and up to 13 for other regulations, after which it may have to cease transmission for some duration, sometimes referred as idle period, perform LBT again, and reinitiate transmission only if LBT is successful. The device may perform LBT towards the end of the idle period. Embodiments can provide modifications to transmission and reception of LTE signals and channels to enable efficient operation in unlicensed spectrum. Some embodiments can relate to LTE 3GPP TS 36.211, which is incorporated by reference in its entirety.

In LTE, physical layer signals and channels, such as control channels like a Physical Downlink Control Channel (PDCCH) and an Enhanced Physical Downlink Control Channel (EPDCCH); data channels like a Physical Downlink Shared Channel (PDSCH); and reference and synchronization signals like a Primary Synchronization Signal (PSS), a Secondary Synchronization Signal (SSS), a Cell-Specific Reference Signal (CRS), a Demodulation Reference Signal (DM-RS) and a Channel State Information-Reference Signal (CSI-RS); and discovery signals, are transmitted on Resource Elements (RE's) of OFDM symbols. For normal Cyclic Prefix (CP) operation, the OFDM symbols are of ~71 us duration. Seven OFDM symbols comprise a 0.5 ms slot and two slots comprise a 1 ms LTE subframe. Therefore, a LTE subframe comprises 14 OFDM symbols, such as symbol 0 to symbol 13 by counting the symbols across both slots.

In LTE Release12 (Rel12) and earlier releases, to receive control signaling, the UE monitors a set of PDCCH/EPDCCH candidates. Monitoring implies attempting to decode each of the candidates according to all applicable Downlink Control Information (DCI) formats for that candidate. The set of PDCCH candidates to monitor are defined in terms of search spaces at different Control Channel Element (CCE) aggregation levels, where an aggregation level indicates the number of CCEs in the aggregation. Similarly, the set of EPDCCH candidates to monitor are defined in terms of search spaces at different Enhanced Control Channel Element (ECCE) aggregation levels. Each CCE consists of multiple Resource-Element Groups (REG's) where REG's are used for defining the mapping of control channels such as PDCCH to time-frequency resources, such as Resource Elements (RE's), within a subframe. For example, in LTE, one RE corresponds to a single subcarrier mapped in frequency domain and a single OFDM symbol mapped in time domain and a REG includes multiple RE's mapped in the frequency domain. Similarly, each ECCE consists of multiple enhanced Resource-Element Groups (eREG's) where eREG's are used for defining the mapping of control channels such as EPDCCH to RE's within a subframe.

In LTE Rel12, the UE expects PDCCH to be transmitted in the beginning OFDM symbols in the time domain of a subframe. For example, when the Physical Control Format Indicator (PCFICH) indicates n=2, the UE expects PDCCH to be transmitted in the first two OFDM symbols. Given this, the UE maps (or determines the mapping for) the RE's in the beginning OFDM symbols to REG's and CCE's, and numbers the CCE's from 0, 1, . . . N_CCE−1. The UE then performs Blind Decodes (BD's) on a set of these CCE's within the superset numbered from 0 to N_CCE−1 to determine if a DCI with the relevant DCI format intended for the UE is transmitted on them. BD's can be performed either on individual CCE's, or on aggregated CCE's. For example, one BD can be performed for one CCE when aggregation level L=1, one BD can be performed for two consecutive CCE's when aggregation level L=2, and so on. The set of CCE's can be given (or determined) by a search space used by the UE to limit its blind decoding complexity. Without a search space, the number of BD's can be large. For example, considering a 20 MHz carrier bandwidth, an OFDM symbol can have ~20-28 CCE's, i.e., up to ~50 CCE's for 2 OFDM symbols. Assuming ~50 CCE's, if the UE has to perform BD's at multiple CCE aggregation levels, such as L=1, 2, 4, 8, and try multiple DCI formats, such as DCI format 0/1A and DCI format 2/2a/2b/2c depending on the transmission mode, for each aggregation level, the UE has to perform close to 200 BD's. To limit the complexity, the UE can use a search space to perform BD's on only a set of candidate CCE's for each aggregation level. For example, for an LTE Rel12 Scell, the UE can monitor 6 candidates at aggregation level 1, 6 candidates at aggregation level 2, 2 candidates at aggregation level 4, and 2 candidates at aggregation level 8, which can be represented in [6, 6, 2, 2] candidates for L=1, 2, 4, 8. Assuming the UE looks for two different DCI formats for each candidate, the total number of BD's can then be restricted to a maximum of (6+6+2+2)*2=32 BD's. In summary, for LTE Rel12, for PDCCH monitoring, the UE can performs BD's to decode DCI intended for the UE, assuming that the PDCCH transmission starts at the first OFDM symbol (i.e., the beginning OFDM symbol) in each subframe where PDCCH is monitored.

In LTE Rel12, if the UE is configured to monitor an EPDCCH in a subframe, it can expect the EPDCCH to be transmitted in one or two sets of frequency domain Physical Resource Blocks (PRB's) called EPDCCH-PRB-sets within the subframe. Similar to PDCCH monitoring, EPDCCH monitoring can also involve a UE performing BD's in a search space corresponding to a set of ECCE's within the EPDCCH-PRB-sets. To reduce UE complexity, the maximum number of BD's for EPDCCH monitoring can also be restricted, such as to 16 BD's per DCI format. Typically, for Scells, the UE can determine the starting OFDM symbol in the time domain for EPDCCH reception within each EPDCCH-PRB-set using higher layer, such as Radio Resource Control (RRC), configuration signaling. In summary, for LTE Rel12, for EPDCCH monitoring, the UE can performs BD's to decode DCI intended for the UE, assuming that the EPDCCH transmission for a particular EPDCCH-PRB-set starts at a starting OFDM symbol, such as 1-epdcch-start, configured by higher layers. For example, for two EPDCCH-PRB-sets, set1 and set2, the eNB can configure 1-epdcch-start-set1as a 3rd OFDM symbol and 1-epdcch-start-set2 as a 4th OFDM symbol. In some cases, the UE may also determine 1-epdcch-start using a Control Format Indicator (CFI) signaled on the PCFICH in the first symbol of the subframe. The same concept of blind decoding splitting and set configurations can also be applied to the case where there are more than two sets of EPDCCH-PRB-sets (e.g three or four).

To enable efficient operation in unlicensed spectrum, an eNB can truncate the transmission of physical layer signals or channels in some subframes to less than 14 OFDM symbols, where 14 OFDM symbols can correspond to a subframe of 1 ms duration, and the eNB can use the truncated portions, such as a remaining portion of the subframe following truncation of the transmission in the subframe, of those subframes to perform LBT or as an idle period.

Truncation can typically be used only after continuous transmission in a certain number of subframes. This can depend on the transmission activity of the eNB which in turn can depend on the data arrival patterns for various UE's served by the eNB. Given this, the truncated subframes may not follow a periodic pattern. Further, which subframes are truncated may also be impacted by the variability of the duration of the idle period or LBT observation period due to, for example, random backoff during LBT procedure when the carrier is detected as occupied. Also, the number of symbols truncated in a given subframe can vary depending on operating parameters chosen by the eNB.

Therefore, from a UE perspective, if the UE is configured with an Scell operating on a carrier/channel in an unlicensed spectrum, and if the Scell is activated for the UE, in order to receive and decode information from physical layer signals and channels in a particular subframe on that Scell, the UE may have to take into account whether the eNB has any transmissions in that subframe; and if there are transmissions, whether the transmissions in that subframe are truncated; and if the transmissions are truncated, the location of those transmissions, such as the starting or ending OFDM symbol of the transmission(s), within that subframe. Embodiments can provide various signaling methods and UE behavior options that enable the UE to do this with reduced complexity.

Figure 2:
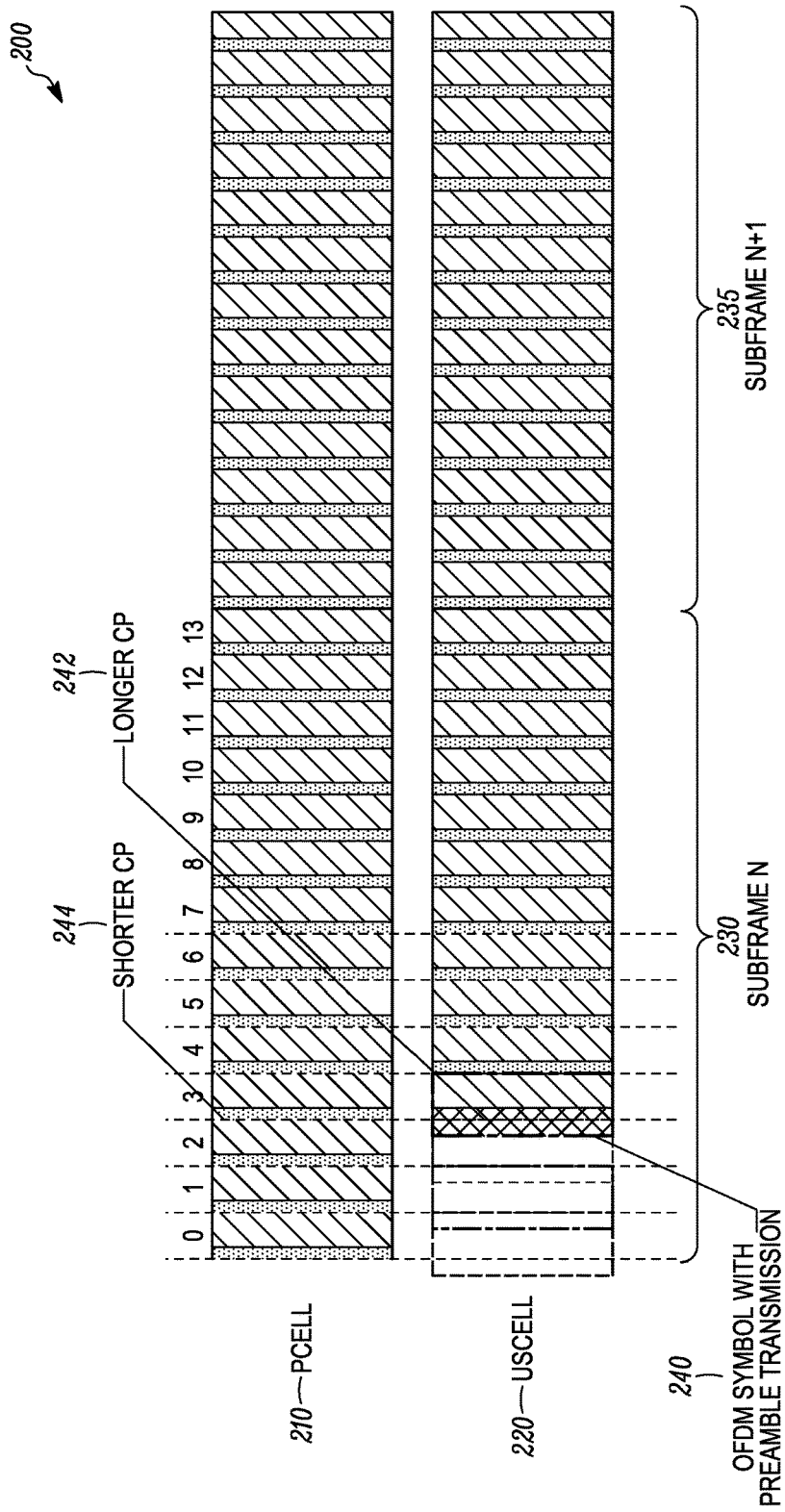
FIG. 2 is an example illustration of subframes including orthogonal frequency multiplexed symbols with different length cyclic prefixes received by a user equipment according to a possible embodiment.

FIG. 2 is an example illustration of subframes 200 including OFDM symbols with different length cyclic prefixes received by a UE according to a possible embodiment. The UE can be configured with a Scell on an unlicensed carrier, such as a uScell, and the Scell can be activated. Once the Scell is activated, the UE can start attempting to detect or decode a preamble transmission made by an eNB. A preamble can be a transmission which the UE can use to determine the beginning of a transmission burst. The total number of subframes of the transmission burst can include the subframe containing the preamble and subsequent subframes that the eNB will be transmitting continuously immediately following the preamble. It can also contain other information. According to a first example (example P1), the preamble transmission can be a reference signal transmission, such as a CRS/PSS/SSS/discovery signal, occupying one or more OFDM symbols. According to a second example (example P2), the preamble transmission can be within an OFDM symbol with some RE's of the OFDM symbol mapped for and/or used/configured for PDCCH and some other RE's of the OFDM symbol mapped for and/or used/configured for reference signals such as CRS. According to a third example (example P3), the preamble transmission can be within an OFDM symbol with some RE's of the OFDM symbol mapped for and/or used/configured for EPDCCH and some other RE's of the OFDM symbol mapped for or used/configured for, reference signals such as demodulation reference signals (DMRS). According to a fourth example (example P4), the preamble transmission can be within two or more consecutive OFDM symbols, a first OFDM symbol or a first set of OFDM symbols containing reference signals, such as CRS/PSS/SSS, followed by a last OFDM symbol with some RE's of the last OFDM symbol mapped for and/or used/configured for PDCCH and some other RE's of the last OFDM symbol mapped for and/or used/configured for reference signals such as CRS. Instead of one last OFDM symbol, two or more OFDM symbols with some RE's of the last OFDM symbol mapped for and/or used/configured for PDCCH and some other RE's of the last OFDM symbol mapped for and/or used/configured for reference signals such as CRS is also possible. According to a fifth example (example P5), the preamble transmission can be within two or more consecutive OFDM symbols, a first OFDM symbol or a first set of OFDM symbols containing reference signals, such as DMRS/PSS/SSS, followed by a last OFDM symbol with some RE's of the last OFDM symbol mapped for and/or used/configured for EPDCCH and some other RE's of the last OFDM symbol mapped for and/or used/configured for reference signals such as DMRS. Instead of one last OFDM symbol, two or more OFDM symbols with some RE's of the last OFDM symbol can be mapped for and/or used/configured for EPDCCH and some other RE's of the last OFDM symbol can be mapped for and/or used/configured for reference signals, such as DMRS.

The UE may assume a longer Cyclic Prefix (CP) with a duration Tcp1, such as extended CP duration as defined in LTE specifications, for the beginning OFDM symbol corresponding to the preamble transmission and a shorter cyclic prefix with duration Tcp2, such as a normal CP duration as defined in LTE specifications, for subsequent symbols in the subframe containing the preamble and other subsequent subframes. According to a possible embodiment, the UE can detect a preamble transmission from a second device in a first set of Orthogonal Frequency Division Multiplexing (OFDM) symbols starting with a first OFDM symbol in a first subframe received on the Scell, the first OFDM symbol having a first Cyclic Prefix (CP). The UE can determine a second OFDM symbol in the first subframe such that the second OFDM symbol immediately follows the first set of OFDM symbols. The UE can decode Downlink Control Information (DCI) containing Physical Downlink Shared Channel (PDSCH) resource assignments in a second set of OFDM symbols beginning with the second OFDM symbol, the second set of OFDM symbols having a second Cyclic Prefix (CP). The duration of the first CP can be larger than the duration of the second CP.

An extended CP can mean the OFDM symbol has a CP length of 512 time domain samples and normal CP can mean the OFDM symbol has a CP length of 144 or 160 time domain samples, where each time domain sample can be 1/(15000*2048) seconds. Other CP lengths can be used for other systems. The extra time domain transmission in the longer CP, such as deltacp=Tcp1-Tcp2, can help the UE better tune its hardware, such as for Automatic Gain Control (AGC) maintenance, for decoding the preamble OFDM symbol and subsequent symbols. This is illustrated in the subframes 200, which show OFDM symbols of Pcell 210 and uScell 220 of two subframes n 230 and n+1 235. In the subframes 200, the UE can attempt to detect/decode a preamble transmission on the Scell in OFDM symbol locations 0, 1, 2, and 3 of subframe n 230 assuming that the OFDM symbol corresponding to preamble transmission has a larger CP 242 than other OFDM symbols that have a shorter CP 244. After detecting the preamble in OFDM symbol 240, the UE can assume a shorter CP for subsequent OFDM symbols in the subframe containing the preamble, such as subframe n 230, and other subsequent subframes, such as subframe n+1 235. This approach can be especially suitable for the second and third examples above where the UE may not assume any prior reference signal transmissions immediately preceding the PDCCH/EPDCCH transmission. For the fourth and fifth examples where the preamble transmission can be within two or more consecutive OFDM symbols, the first OFDM symbol of the preamble transmission can use a longer CP, while the remaining OFDM symbols of the preamble transmission can use a shorter CP.

For the second, third, fourth, and fifth examples, the preamble can carry Downlink Control Information (DCI) that can provide information, such as preamble information, about the subframe containing the preamble and a set of subsequent subframes immediately following the preamble, sometimes also referred as the portion of transmission burst following the preamble. Preamble information can indicate the number of subsequent subframes that the eNB will be transmitting continuously immediately following the preamble. For example, the DCI can have 4 bits indicating N_TX_BURST, the total number of subframes of the transmission burst, such as the subframe containing the preamble and subsequent subframes that the eNB will be transmitting continuously immediately following the preamble. Details about other additional information that the DCI can provide are given below. The DCI can be Cyclic Redundancy Check (CRC) masked using a special identifier associated with preamble reception, such as a Preamble Radio Network Temporary Identifier (PRE-RNTI). The UE can be configured by higher layers, such as RRC or Medium Access Control (MAC) layers, with a PRE-RNTI value. The PRE-RNTI value may also be based on the cell ID or virtual cell ID used for transmission of the cell-specific reference signals or discovery signals for the corresponding Scell. The DCI can be sent using a compact DCI format such as DCI Format 1C or DCI Format 1A, or any new payload size(s) defined for preamble DCI. The preamble DCI may be of multiple different payload sizes, and a UE may be configured via higher layers with one or multiple payload sizes to search for.

For the second and fourth examples, in the OFDM symbol where the UE expects preamble PDCCH transmission, the UE can map the RE's in the OFDM symbol to REG's, such as 4 REs per REG or 6 RE's per REG, and CCE's, such as 9 REG's per CCE, and number them from 0, 1, . . . N_preCCE−1. The UE can then perform BD's on a set of these CCE's within the superset numbered from 0 to N_preCCE−1 to determine if DCI with the relevant DCI format containing the preamble information is transmitted on them. BD's can be performed either on individual CCE's, or on aggregated CCE's. For example, a UE can try a maximum of 4 BD's at aggregation level 4, such as with starting CCE locations 0, 4, 8, 12, and 2 BD's at aggregation level 8, such as with starting CCE locations 0, 8. In a second example, the aggregation levels, and/or the number of BD's per aggregation level, etc. may be configured via higher layer signaling.

For the third and fifth examples, in the OFDM symbol where the UE expects preamble EPDCCH transmission, the UE can map the RE's in the OFDM symbol to eREGs and ECCE's, and number them from 0, 1, . . . N_preECCE−1. The UE can then performs BD's on a set of these ECCEs within the superset numbered from 0 to N_preECCE−1 to determine if DCI with the relevant DCI format containing preamble information is transmitted on them. BD's can be performed either on individual ECCE's or on aggregated ECCE's. For example, a UE can try a maximum of 4 BDs at aggregation level 4, such as with starting ECCE location 0, 4, 8, 12, and 2 BD's at aggregation level 8, such as with starting ECCE locations 0, 8. In a second example, the aggregation levels, and/or the number of BD's per aggregation level, etc. may be configured via higher layer signaling.

In one embodiment, the antenna port(s) on which the reference signal(s) associated with the preamble transmission are transmitted is assumed to be quasi co-located with antenna port(s) of at least a portion of the reference signals associated with discovery signals transmissions within the discovery signal occasion on the Scell. The reference signals associated with discovery signals transmissions can comprise cell-specific reference signals on antenna port 0, and non-zero-power CSI reference signals on CSI-RS antenna ports 15-22. For the second and fourth examples, the CRS reference signal antenna ports (associated with the preamble transmission) may be assumed to be quasi co-located with cell-specific reference signals on antenna port 0 of the discovery signal. For the third and fifth examples, the UE may be configured to assume the antenna port(s) on which Demodulation Reference Signal (DMRS) (associated with the preamble transmission) are transmitted is quasi co-located with CSI-RS antenna ports of the discovery signals. An antenna port can be defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties can include one or more of delay spread, Doppler spread, Doppler shift, average gain, and average delay. Discovery signals may be transmitted on the Scell to enable the UE to perform Radio Resource Management (RRM) measurements functions.

While attempting to detect/decode the preamble transmission, the UE can assume that the end of the OFDM symbol(s) containing preamble transmission is/are aligned with the end of the OFDM symbol boundaries on Pcell within a small timing error difference, such as +/−31.3 us (micro-seconds) when compared to Pcell. Alternately, the UE may determine the end of the OFDM symbol boundary of the preamble transmission by first detecting a discovery signal on the Scell and then use that discovery signal to determine symbol timing.

While attempting to detect/decode the preamble transmission, for each subframe, the UE may assume that the preamble transmission can only begin within a subset of OFDM symbol positions within the subframe. For example, the UE can detect a preamble transmission from a second device in a first set of Orthogonal Frequency Division Multiplexing (OFDM) symbols starting with a first OFDM symbol in a first subframe received on the Scell where the first OFDM symbol can have a first Cyclic Prefix (CP). According to a first example, the UE can assume possible preamble start positions are OFDM symbols 0, 1, 2, 3, 4, 5, 6, such as any symbol in the first slot, in each subframe. According to a second example, the UE can assume possible preamble start positions are OFDM symbols 0, 1, 2, 3 in each subframe, which can be suitable for EPDCCH based operation. According to a third example, the UE can assume possible preamble start positions are OFDM symbols 6, 13 in each subframe, such as the last symbol in each slot. According to a fourth example, the UE can assume possible preamble start positions are OFDM symbols 5, 6, 12, 13 in each subframe, such as the last two symbols in each slot. According to a fifth example, the UE can assume possible preamble start positions are OFDM symbols 0, 1, 2, 3, 4, 5, 6, 7, such as any symbol in the first slot and the first symbol in the second slot, in each subframe. According to a sixth example, if the UE is configured to monitor the PDCCH in subframe n for receiving PDSCH resource assignment(s), it can assume preamble start positions are OFDM symbol 13 in subframe n−1, and OFDM symbol 6 in subframe n. If the UE is configured to monitor the EPDCCH in subframe n for receiving PDSCH resource assignments, it can assume preamble start positions are OFDM symbol 13 in subframe n−1, and OFDM symbols 0, 1, 2, 3 in subframe n. According to a seventh example, the UE can assume the preamble can start from any OFDM symbol, such as symbols 0-13, in the subframe. For the first through sixth examples, the subset can be smaller than all 14 possible starting locations. These examples can help reduce UE preamble detection complexity. In the subframe n where the UE detects/decodes the preamble, the UE can attempt to decode control channels, such as PDCCH or EPDCCH, for DCI containing resource assignment(s) for PDSCH transmission starting with the first OFDM symbol immediately following the OFDM symbol where preamble is detected/decoded or a predetermined OFDM symbol following the OFDM symbol where preamble is detected/decoded. For example, the UE can determine a second OFDM symbol in the first subframe such that the second OFDM symbol immediately follows the first set of OFDM symbols. For the second, third, fourth, and fifth examples above (i.e., P2, P3, P4, P5), since the UE may have to perform BD's in the preamble OFDM symbol to decode the DCI that can contain preamble information, in order to keep the UE BD complexity low, the UE can perform a smaller number of BD's to decode control channels, such as PDCCH or EPDCCH, for DCI containing resource assignments for PDSCH transmission. For example, the UE can use maximum of 13 BD's per DCI format, such as [5, 5, 2, 1] BD candidates for L=1, 2, 4, 8. According to a possible implementation, the UE can be a first device that can communicate with a second device using a primary serving cell (Pcell) operating on a licensed carrier and a secondary serving cell (Scell) operating on an unlicensed carrier. The first device can detect a preamble transmission from the second device in a first set of at least one Orthogonal Frequency Division Multiplexing (OFDM) symbol starting with a first OFDM symbol in a subframe received on the Scell. The first OFDM symbol can have a first Cyclic Prefix (CP). The first device can determine a second OFDM symbol in the subframe such that the second OFDM symbol can immediately follow the first set of OFDM symbols. The first device can decode Downlink Control Information (DCI) containing Physical Downlink Shared Channel (PDSCH) resource assignment in a second set of OFDM symbols beginning with the second OFDM symbol. The second set of OFDM symbols can have a second Cyclic Prefix (CP). The duration of the first CP can be larger than the duration of the second CP.

In subsequent subframes immediately following the subframe in which the preamble is detected or decoded, the UE can attempt to decode control channels, such as PDCCH or EPDCCH, for DCI containing resource assignments for PDSCH transmission using the same OFDM symbol starting positions it would for a subframe without truncation. If N_TX_BURST is provided as part of the DCI containing preamble information as discussed earlier, the UE can do this for N_TX_BURST−1 subframes. Alternatively, N_TX_BURST can be provided to the UE via RRC signaling or through activation Medium Access Control layer Control Element (MAC layer CE), or through an activation command received via PDCCH/EPDCCH on Pcell. To monitor PDCCH, the UE can assume PDCCH starts with the first OFDM symbol, such as symbol 0. The UE can a use maximum of 16 BD's per DCI format, such as [6, 6, 2, 2] BD candidates for L=1, 2, 4, 8. To monitor EPDCCH, the UE can assume that the EPDCCH transmission for a particular EPDCCH-PRB-set starts at a starting OFDM symbol, such as 1-epdcch-start, configured by higher layers or can determine it using PCFICH transmitted in the first OFDM symbol of the subframe. The UE can use a maximum of 16 BD's per DCI format for EPDCCH reception across all EPDCCH-PRB-sets.

According to another possible embodiment, a UE can be configured with a Scell on an unlicensed carrier, and the Scell can be activated. Once the Scell is activated, the UE can start monitoring PDCCH/EPDCCH for DCI providing resource assignment information to receive PDSCH. According to a first example, in each activated subframe, the UE can try 2 BD's for PDCCH and 2 BD's for each EPDCCH in a EPDCCH-PRB-set with starting symbols x1, x2, x3, where x1, x2, x3 can be RRC configured. According to a second example, in each activated subframe, the UE can try 4 BD's for PDCCH, 3 BD's for EPDCCH in a EPDCCH-PRB-set with starting symbol x1, and one BD for EPDCCH in a EPDCCH-PRB-set with starting symbol x2, where x2 can be a large value (e.g. x2>4). In this example, fewer BDs are allocated for starting symbol x2 since it may be difficult to schedule multiple UE's in only few symbols. According to a third example, in each activated subframe, the UE can try 4 BD's for PDCCH and 2 DCI formats; only one DCI format for EPDCCH and 3 BD's for EPDCCH in a EPD-CCH-PRB-set with starting symbols x1, and 3 BD's for EPDCCH in a EPDCCH-PRB-set with starting symbol x2, and 2 BD's for EPDCCH in a EPDCCH-PRB-set with starting symbol x3. In this example, DCI Format 1A may only be supported on PDCCH and not monitored for EPD-CCH. According to a fourth example, the UE can try no PDCCH BD's, 2 BD's for EPDCCH with start symbol x1 and end symbol y1, 2 BD's for EPDCCH with start symbol x1 and end symbol y2, 2 BD's for EPDCCH with start symbol x2 and end symbol y1, 2 BD's for EPDCCH with start symbol x3 and end symbol y1, where y1=13, x1=0 and x2, y2 are RRC configured, or alternately all positions (x1, y1, x2, y2) are RRC configured. In these examples, to monitor PDCCH, the UE can assume PDCCH transmission starts in OFDM symbol 0 of each monitored subframe. Other examples where the UE assumes PDCCH transmission start either in OFDM symbol 0 or in OFDM symbol 7 of the subframe are also possible.

The UE can use a N_TX_BURST value, which can be provided to it via RRC signaling, through activation MAC layer CE-medium access control layer control element or can be provided through an activation command received via PDCCH/EPDCCH on the Pcell. The N_TX_BURST value can indicate the total number of subframes of a transmission burst, which can be the number of subframes that the eNB can continuously transmit before discontinuing transmission due to LBT or idle period requirements.

If the UE successfully decodes a PDCCH with starting symbol other than OFDM symbol 0 (i.e., the initial OFDM symbol in the subframe), or if the UE successfully decodes an EPDCCH with starting symbol greater than OFDM symbol 3, the UE can determine that the front-portion of this subframe is truncated. The UE can also determine that the next N_TX_BURST−1 subframes will not be truncated in the front-portion. UE can use this knowledge to reassign its BD's for the next N_TX_BURST−1 subframes.

For example, the UE can initially monitor the PDCCH assuming a PDCCH transmission starts either in OFDM symbol 0 or in OFDM symbol 7. If the UE successfully decodes a PDCCH with starting symbol other than OFDM symbol 0 in subframe n, then from subframe n+1 to n+N_TX_BURST−1, the UE can monitor PDCCH by assuming PDCCH transmission starts only in OFDM symbol 0. In this example, for subframe n, the UE can perform k1 BD's, such as for k1=3, for aggregation level L1, such as with L1=2, by assuming PDCCH transmission starts in OFDM symbol 0, and can performs k2 BD's, such as for k2=3, for the same aggregation level L1 by assuming PDCCH transmission starts in OFDM symbol 7. However, for subframes n+1 to n+N_TX_BURST−1, for the same aggregation level L1, the UE can perform k3=k1+k2, such as k3=6, BD's by assuming the PDCCH transmission starts only in OFDM symbol 0, where k3>k1.

As another example, the UE can initially monitor EPD-CCH assuming EPDCCH transmission in a particular EPD-CCH-PRB-set starts either in OFDM symbol x1 or in OFDM symbol x2, where x1<=3 and x2>3. If the UE successfully decodes an EPDCCH with starting OFDM symbol x2 in subframe n, from subframe n+1 to n+N_TX_BURST−1, the UE can monitor EPDCCH by assuming the EPDCCH transmission starts only in OFDM symbol x1. In this example, for subframe n, the UE can perform k1 BD's, such as for k1=3, for aggregation level L1, such as for L1=2, by assuming EPDCCH transmission starts in OFDM symbol x1, and can perform k2 BD's, such as for k2=3, for the same aggregation level L1 by assuming EPDCCH transmission starts in OFDM symbol x2. However, for subframes n+1 to n+N_TX_BURST−1, for the same aggregation level L1, the UE can perform k3=k1+k2, such as k3=6, BD's assuming EPDCCH transmission starts only in OFDM symbol x1, where k3>k1.

According to a possible implementation of this embodiment, a UE can monitor in a first subframe, a first set of a first number (k1) of control channel Blind Decoding (BD) candidates at an aggregation level for a control channel transmission in the first subframe starting from a first OFDM symbol position (s1) in the first subframe. The UE can monitor in the first subframe, a second set of a second number (k2) of control channel BD candidates at the aggregation level for a control channel transmission in the first subframe starting from a second OFDM symbol (s2) position in the first subframe. The UE can determine DCI intended for the device is successfully decoded from a candidate in the second set. The UE can then monitor in a second subframe, a third set of a third number (k3) of control channel BD candidates (where k3>k1 and k3>k2) at the aggregation level for a control channel transmission in the second subframe starting only from a first OFDM symbol position (s1) in the second subframe when DCI intended for the device is successfully decoded from a candidate in the second set of the second number (k2) of control channel BD candidates. The first OFDM symbol position (s1) in the first subframe can be the same position as the first OFDM symbol position (s1) in the second subframe.

While embodiments described above are explained in the context of unlicensed Scells, the methods can also be used for UE/eNB operation on a Scell operating on a licensed carrier, and some of the methods can also be used for UE/eNB operation on a Pcell.

As far as information transmitted in a preamble, as discussed above, a preamble can provide information about an LTE transmission burst on an unlicensed carrier. The preamble can be carried on the unlicensed carrier at the beginning of the burst, for example, and a preamble sent in OFDM symbols x through y, where x can be a value from 1 to 14 (assuming, for this example, the beginning OFDM symbol in the subframe is OFDM symbol 1, and last OFDM symbol in the subframe is OFDM symbol 14) and y can be a value from 1 to 14, may indicate to the UE one or more of different parameters. In other implementations, x and y can be a value from 0 to 13. For example, a preamble can indicate the eNB transmission burst duration. A preamble sent in OFDM symbols x through y can also indicate subframes that are configured downlink subframes in the burst and possibly the subframe configuration. A preamble sent in OFDM symbols x through y can also indicate subframes that are configured as uplink subframes in the burst and possibly the subframe configuration. A preamble sent in OFDM symbols x through y can also indicate subframes that are configured as special subframes, such as with truncation and type of truncation, such as front truncation or back truncation or both front and back-truncations, in the burst. A preamble sent in OFDM symbols x through y can also indicate presence/absence of control channels and/or control channel configuration, such as search space details, number of blind decodes per control channel type, etc., in each subframe of a burst, where there may be multiple control channel configurations depending on how the eNB may desire to perform LBT. A preamble sent in OFDM symbols x through y can also indicate the presence/absence of certain reference signals and/or configuration of the reference signals, such as CRS, PSS, SSS, DRS, etc., in subframes of the burst. A preamble sent in OFDM symbols x through y can also indicate the presence/absence of and/or configuration of Multimedia Broadcast Multicast Service (MBMS) transmissions in the burst. A preamble sent in OFDM symbols x through y can also indicate the presence/absence of and/or configuration of Positioning Reference Symbols (PRS) in the burst. A preamble sent in OFDM symbols x through y can also indicate a configuration of the uplink signals/channels, such as whether Sounding Reference Signal (SRS) is configured or not configured. A preamble sent in OFDM symbols x through y can also indicate forward-compatibility/release-signaling/blank subframe signaling. A preamble sent in OFDM symbols x through y can also indicate LBT configuration information, such as for coordination with neighboring nodes.

Instead of signaling the above parameters in a preamble on an unlicensed carrier, one or more of the above parameters may be signaled to the UE via a licensed carrier that is configured to the UE, such as in a common or UE-specific search space on the primary or a secondary cell. This information can sent using a DCI format 1C similar to Enhanced Interference Mitigation and Traffic Adaptation (EIMTA) signaling or DCI format 1A associated with the unlicensed carrier. The transmission burst duration may be the duration for which the base station transmits the downlink signal or the duration for which the base station intends to transmit the downlink signals. In some cases, the base station may cease transmission before its transmission burst duration, such as when it has no data to transmit. Signalling of the the transmission burst duration may be the indicator to the UE of when the UE can restart looking for the preamble from the eNB.

Typically, a UE may be configured to detect a preamble associated with its serving cell on the unlicensed carrier. However, the UE may also detect or be configured to detect a preamble associated with one or more adjacent cells on the unlicensed carrier. If the UE can detect a preamble from the adjacent cell, it may be able to use that information as assistance information for improving its performance. It may also be able to use that information to enhance in-device co-existence, such as if the UE detects a transmission burst from an eNB, the UE may be able to adapt the WiFi LBT operation in the UE based on the LTE transmission burst.

Neighboring eNBs may be able to listen to over-the-air transmissions of the preamble from the eNB to adapt their LTE transmission/reception. Typically for a single operator scenario, there may be fiber connectivity between eNBs of a single operator, which may not require over-the-air inter-eNB communication, but, for multi-operator scenarios, over-the-air reception of the preambles may provide some benefit for coordination.

An eNB can indicate via higher layers if it allows front truncation only (truncation during the beginning OFDM symbol(s) of a subframe), back truncation only (truncation during the ending OFDM symbol(s) of a subframe), or both front and back-truncations. For configuration of types of truncation, if an eNB indicates that front truncation is not configured, then the UE can assume that any subframe used for LTE transmission has at least CRS present in the first one or two OFDM symbols. If an eNB indicates that front truncation is configured and UE detects EPDCCH in a subframe, then the UE can assume that the subframe does not have CRS present in the first one or two OFDM symbols. If the corresponding DCI in the EPDCCH indicates a PDSCH starting symbol that is earlier, such as OFDM symbol 0, for transmission modes 1-8 or TM1-8, then the UE can assume CRS is present in the first one or two OFDM symbols. If an eNB indicates that front truncation is configured and UE detects PDCCH in a subframe, then the UE can assume that the subframe has CRS present in the first one or two OFDM symbols.

Typically, both PDCCH and EPDCCH can be used as control channels on unlicensed carriers. Depending on the amount of flexibility required, such as when control can start at any arbitrary OFDM symbol relative to LTE subframe timing, the respective control channel designs can be enhanced. PDCCH, may have better coverage/performance than distributed EPDCCH, and can be of short transmission duration, such as 1-4 OFDM symbols, which can be more suitable when last symbols of a subframe are truncated for CCA. However, changes can be made if first symbols of a subframe may have to be truncated, such as using different starting positions. For PDCCH, the best alternative location can be the first 2-3 symbols of second slot, assuming that CRS can be present only in legacy RE locations. EPDCCH can work without changes if first 2 or 3 symbols in a subframe are always set aside, such as for LBT operation, and it may need changes if the last symbols of a subframe need to be truncated for LBT. It can be feasible to operate with EPDCCH only. With different start and end symbols, new DMRS patterns may be required. CRS-based demodulation can also be used for EPDCCH. More EPDCCH sets, e.g. >2, or for each set, more than one start and end symbols can be configured.

A UE can be configured to detect/decode both EPDCCH and PDCCH. The detection may be done in the same subframe or a time-division multiplexing fashion at subframe level. For example, the UE can attempt to detect EPDCCH in a first set of subframes, and can attempt to decode PDCCH in a second set of subframes, where the first and second sets do not overlap. For UE-specific search space, the UE may attempt to decode PDCCH/PCFICH as in Rel12, and it may also attempt to decode EPDCCH with one or multiple starting positions. If UE decodes PDCCH, then the detected DCI on the PDCCH can inform the UE of the number of symbols truncated at end for PDSCH. If UE decodes EPDCCH, the same starting symbol as EPDCCH can be assumed for PDSCH and no truncation assumed at end of subframe.

Typically both front and back truncation may be required. The truncation value for PDSCH can be indicated via the control channel. For instance, in DCI transmitted on PDCCH, the field may indicate end-truncation value, while for DCI transmitted on the EPDCCH, the field may indicate the front-truncation value. Therefore, UE can receive downlink control information in one of two types of control channels, can interpret a subframe truncation field in the received DCI based on the type of control channel on which the DCI is received, and can attempt to decode data based on the interpreted subframe truncation field values and other information in the DCI. Here, the truncation can be a front truncation in a subframe if the DCI is received in the PDCCH, and the truncation can be a back truncation in a subframe if DCI is received in the EPDCCH. For example, the UE can receive Downlink Control Information (DCI) containing PDSCH resource assignment(s) in one of two types of control channels in a subframe. The UE can determine a type of truncation of the subframe based on the type of control channel on which the DCI is received. The UE can decode the PDSCH based on at least the determined type of truncation of the subframe.

If a UE has to blindly detect whether a subframe is back-truncated or front-truncated, then the UE can be configured to blindly detect some PDCCH candidates to detect back-truncation and some EPDCCH candidates to detect front-truncation in that subframe. Another alternative can be to use an indicator that dynamically indicates to the UE which hypotheses the UE should perform in a given subframe or set of subframes. For instance, a 1-bit indicator can be signaled on the Pcell or as part of an initial signal transmission on an unlicensed carrier to indicate which control channels the UE should monitor in a given subframe. If in most subframes, there may be no truncation, then more blind decodes can be allocated to a control channel that begins earlier in the subframe than to a control channel that begins later in the subframe. For example, PDCCH BD's can be more than the EPDCCH BD's. In another example, an EPDCCH set with starting symbol 0 may have more BD's than another EPDCCH set with starting symbol 3. Therefore, for EPDCCH, BD's can be split for different sets based on an EPDCCH starting symbol value. The aggregation levels can be configurable per control channel or EPDCCH sets. More EPDCCH sets can be defined to allow variable starting symbols, or more starting symbols can be hypothesized for the same EPDCCH set.

For a UE configured in TM10 and configured with at least PDCCH-based control channels, the UE may assume that CRS is present only in the first 1 or 2 OFDM symbols in the subframe. This can reduce overhead due to CRS. This can be equivalent to stating that each subframe may be assumed be a Multicast-Broadcast Single-Frequency Network (MB-SFN) subframe, except perhaps the subframes configured for discovery signal transmission. For UE configured in TM10 and configured with only EPDCCH-based control channels, the UE may assume that CRS is present in none of the symbols in the subframe. This can reduce overhead due to CRS, and can be equivalent to stating that each subframe can be assumed to be a new type of subframe, such as a blank subframe, except the subframes configured for discovery signal transmission, where some CRS may be present as part of discovery signal.

Figure 3:
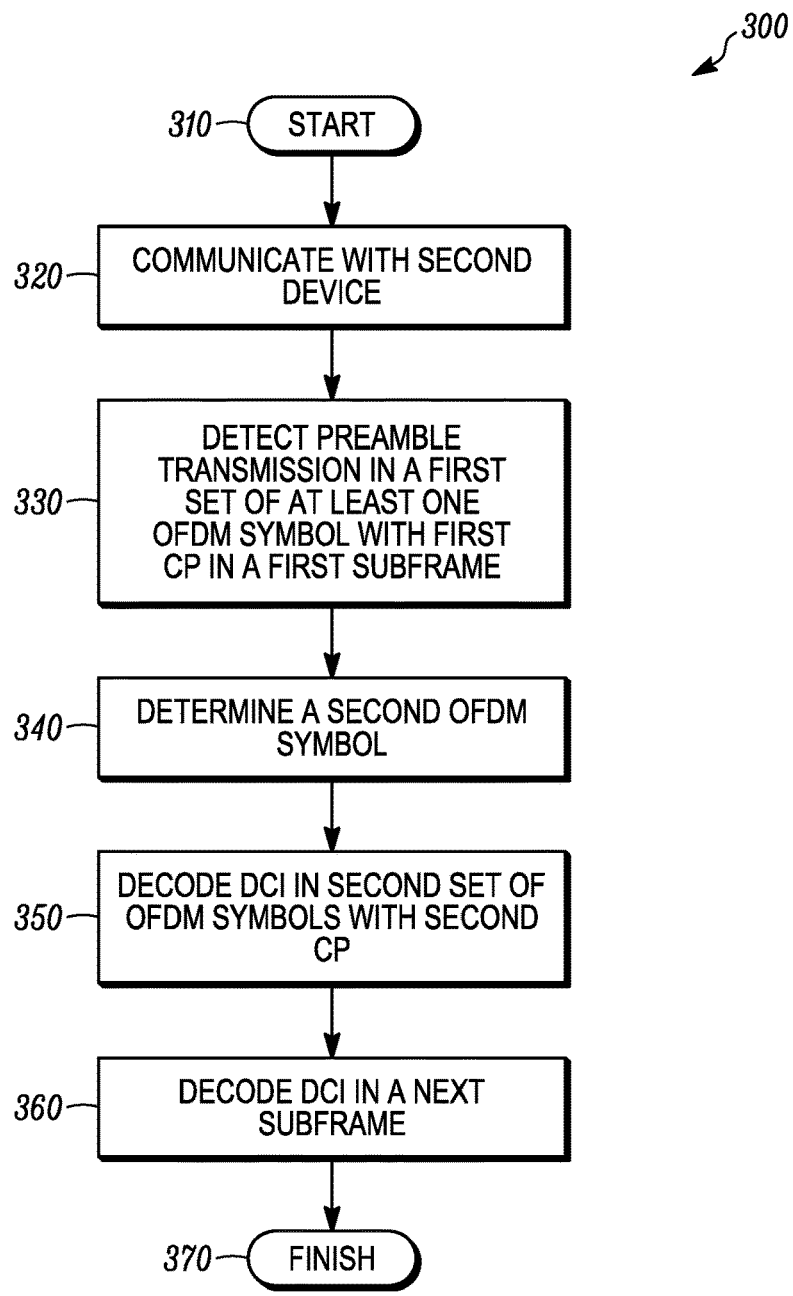
FIG. 3 is an example flowchart illustrating the operation of a wireless communication device according to a possible embodiment.

FIG. 3 is an example flowchart 300 illustrating the operation of a wireless communication device, such as the first device 110, according to a possible embodiment. At 310, the flowchart 300 can begin. At 320, the device can communicate with a second device, such as the second device 120, using a primary serving cell (Pcell) operating on a licensed carrier and a secondary serving cell (Scell) operating on an unlicensed carrier.

At 330, a preamble transmission from the second device can be detected in a first set of Orthogonal Frequency Division Multiplexing (OFDM) symbols starting with a first OFDM symbol in a subframe received on the Scell. The first OFDM symbol can have a first Cyclic Prefix (CP). A preamble can be a transmission which the wireless communication device can use to determine the beginning of a transmission burst. When detecting the preamble transmission, the wireless communication device can also decode the preamble transmission. The first set of at least one OFDM symbol can be only the first OFDM symbol. For example, the preamble can be one or two OFDM symbols. At least one RE of the first OFDM symbol can be mapped for at least one of the following signals: a Primary Synchronization Signal (PSS), a Secondary Synchronization Signal (SSS), a Cell-specific Reference Signal (CRS), a Discovery Signal, a Channel State Information-Reference Signal (CSI-RS), and a wireless communication device-specific reference signal. The preamble transmission can be within the first OFDM symbol with a first set of Resource Elements (RE's) of the first OFDM symbol configured for a Physical Downlink Control Channel (PDCCH) and a second set of RE's of the first OFDM symbol mapped for reference signals. For example, the other RE's of the first OFDM symbol can be mapped for reference signals, such as Cell Specific Reference Signals (CRS's). A first set of RE's of the first OFDM symbol can be mapped for an Enhanced PDCCH (EPDCCH) and a second set of RE's of the first OFDM symbol are mapped for reference signals. For example, the other RE's of the first OFDM symbol (i.e., the second set of RE's) can be mapped for reference signals, such as Demodulation Reference Signals (DMRS's). The first and second set of RE's may typically not overlap.

Detecting the preamble transmission can include hypothesizing that the preamble transmission begins within a subset of OFDM symbol positions within the subframe. The wireless communication device can do blind detection to determine the location of the preamble transmission. An end of the first OFDM symbol can be aligned with an end of OFDM symbol boundaries on the Pcell within a timing error difference. For example, the given error difference can be a small timing error difference, such as +/−31.3 us.

The preamble transmission can carry preamble information indicating a number of subsequent subframes that the second device intends to transmit continuously immediately following the first subframe. The subframe can be a first subframe and the preamble information can have 4 bits indicating a total number of subframes of a transmission burst including the first subframe and subsequent subframes the second device transmits continuously immediately following the first subframe. For example, the 4 bits can indicate N_TX_BURST as the total number of subframes of the transmission burst. The preamble information can be encoded with a Cyclic Redundancy Check (CRC) parity code and the CRC parity bits can be masked using a special identifier associated with preamble reception. For example, the special identifier can be a Preamble Radio Network Temporary Identifier (PRE-RNTI). The special identifier can be a cell ID or a virtual cell ID associated with the Scell and which can be indicated to the wireless communication device as part of RRC/MAC configuration message. Detecting the preamble transmission can include decoding a downlink control information (DCI) containing preamble information in the first subframe by monitoring a maximum of a first number (N1) of control channel blind decoding candidates. For example, a maximum of N1 control channel blind decoding candidates can be monitored, where N1=N14+N18, and N14 and N18 can be a number of control channel blind decoding candidates corresponding to CCE/ECCE aggregation level 4 and 8 respectively, and where N14=4 and N18=2. Detecting the preamble transmission can include successfully decoding downlink control information (DCI) containing preamble information.

Detecting a preamble transmission from the second device in a first set of at least one Orthogonal Frequency Division Multiplexing (OFDM) symbol starting with a first OFDM symbol in a subframe received on the Scell, the first OFDM symbol having a first Cyclic Prefix (CP) can be another way of saying detecting a preamble transmission from the second device in a first set of Orthogonal Frequency Division Multiplexing (OFDM) symbols starting with a first OFDM symbol in a subframe received on the Scell by assuming that a first cyclic prefix value is used for the first OFDM symbol. For example, by "assuming," the wireless communication device can detect the preamble by using hypotheses for first and second CP values.

At 340, a second OFDM symbol can be determined in the subframe such that the second OFDM symbol immediately follows the first set of OFDM symbols.

At 350, Downlink Control Information (DCI) containing Physical Downlink Shared Channel (PDSCH) resource assignment can be decoded in a second set of OFDM symbols beginning with the second OFDM symbol in the first subframe, the second set of OFDM symbols having a second Cyclic Prefix (CP). The DCI can be decoded by monitoring a maximum of a second number (N2) of control channel blind decoding candidates. For example, a maximum of N2 control channel blind decoding candidates can be monitored, where N2=N21+N22+N24+N28 and where N21, N22, N24, and N28 can be a number of control channel blind decoding candidates corresponding to CCE/ECCE aggregation levels 1, 2, 4, and 8 respectively. The duration of the first CP can be larger than the duration of the second CP. For example, the first CP can be an extended CP and the second CP can be a normal CP. As a further example, extended CP can mean the OFDM symbol has a CP length of 512 time domain samples and normal CP can mean the OFDM symbol has a CP length of 144 or 160 time domain samples, where each time domain sample can be 1/(15000*2048) seconds. The DCI containing preamble information can also be decoded as part of the preamble detection at 330. Decoding Downlink Control Information (DCI) containing Physical Downlink Shared Channel (PDSCH) resource assignment in a second set of OFDM symbols beginning with the second OFDM symbol, the second set of OFDM symbols having a second Cyclic Prefix (CP) can be another way of saying decoding Downlink Control Information (DCI) containing Physical Downlink Shared Channel (PDSCH) resource assignment in a second set of OFDM symbols beginning with the second OFDM symbol by assuming a second cyclic prefix value is used for the second set of OFDM symbols.

At 360, DCI containing PDSCH resource assignment can be decoded in a second subframe immediately following the first subframe by monitoring a maximum of a third number (N3) of control channel blind decoding candidates where the third number (N3) can be greater than the second number (N2). For example, a maximum of N3 control channel blind decoding candidates can be monitored where N3 can be greater than N2, where N3=N31+N32+N34+N38 and where N31, N32, N34, and N38 can be a number of control channel blind decoding candidates corresponding to CCE/ECCE aggregation levels 1, 2, 4, and 8 respectively. At 370, the flowchart 300 can end.

Figure 4:
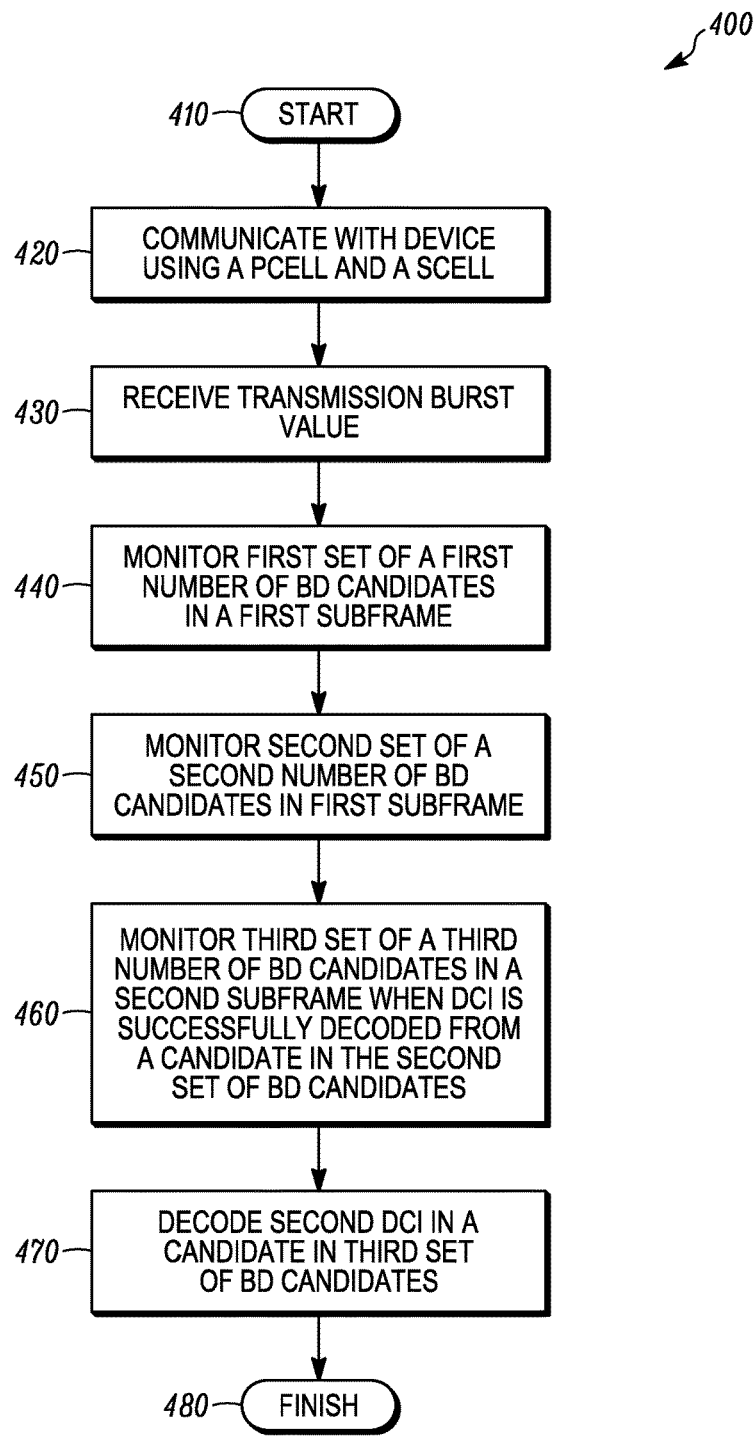
FIG. 4 is an example flowchart illustrating the operation of a wireless communication device according to a possible embodiment.

FIG. 4 is an example flowchart 400 illustrating the operation of a wireless communication device, such as the first device 110, according to a possible embodiment. The operations of the flowchart 400 and the other flowcharts can be performed on a Scell, on a Pcell, on a combination of a Scell and a Pcell, or on any other cell. At 410, the flowchart 400 can begin. At 420, the wireless communication device can communicate with a second device using a primary serving cell (Pcell) operating on a licensed carrier and a secondary serving cell (Scell) operating on an unlicensed carrier. The operations of the flowchart 400 and the other flowcharts can also be performed completely on a Scell, on a Pcell, on a combination of a Scell and a Pcell, or on any other cell or combinations of cells.

At 430, a transmission burst value can be received via higher layers than a physical layer. The transmission burst value can indicate a number of subframes of a transmission burst received before a continuous transmission of the subframes is discontinued. For example, the device can receive a N_TX_BURST value that can be provided to it via RRC signaling, can be provided through activation Medium Access Control layer Control Element (MAC layer CE), can be provided through an activation command received via PDCCH/EPDCCH on a Pcell. The value can be provided to the device from another device, such as a base station or any other device that can provide a transmission burst value.

At 440, a first set of a first number (k1) of control channel Blind Decoding (BD) candidates can be monitored in a first subframe at an aggregation level for a control channel transmission in the first subframe starting from a first OFDM symbol position (s1) in the first subframe. Monitoring can mean attempting to decode. At 450, a second set of a second number (k2) of control channel BD candidates can be monitored in the first subframe at the aggregation level for a control channel transmission in the first subframe starting from a second OFDM symbol (s2) position in the first subframe. The first OFDM symbol position (s1) in the first subframe can be the same position as the first OFDM symbol position (s1) in the second subframe.

According to a possible embodiment, the control channel can be a PDCCH and the control channel BD candidates can be PDCCH BD candidates. According to a possible implementation, the first OFDM symbol position can be the initial OFDM symbol in the subframe and the second OFDM symbol position can be an OFDM symbol whose position can be an integer number of OFDM symbols later than the initial OFDM symbol in the subframe. According to another possible implementation, the first OFDM symbol position can be the initial OFDM symbol in the subframe and the second OFDM symbol position can be an OFDM symbol whose position can be seven OFDM symbols later than the initial OFDM symbol in the subframe. For example, the second OFDM symbol can be the eighth symbol in the subframe. In an instance where the first symbol is labeled with a zero (0), the second OFDM symbol as the eighth symbol can be labeled with a seven (7).

According to another possible embodiment, the control channel can an EPDCCH and the control channel BD candidates can be EPDCCH BD candidates within a first set of frequency domain resource blocks (RBs) configured by layers higher than a physical layer. According to a possible implementation, the first OFDM symbol position can be the initial OFDM symbol in the subframe and the second OFDM symbol position can be an OFDM symbol whose position can be an integer number of OFDM symbols later than the initial OFDM symbol in the subframe. According to another possible implementation, the first OFDM symbol position can be the initial OFDM symbol in the subframe and the second OFDM symbol position can be an OFDM symbol whose position can be four OFDM symbols later than the initial OFDM symbol in the subframe. For example, the second OFDM symbol can be the fifth symbol in the subframe. In an instance where the first symbol is labeled with a zero (0), the second OFDM symbol as the fifth symbol can be labeled with a four (4).

At 460, a third set of a third number (k3) of control channel BD candidates can be monitored in a second subframe at the aggregation level for a control channel transmission in the second subframe starting only from a first OFDM symbol position (s1) in the second subframe when a Downlink Control Information (DCI) intended for the device is successfully decoded from a candidate in the second set of the second number (k2) of control channel BD candidates, where k3>k1 and k3>k2. The third number (k3) of control channel BD candidates can be equal to the first number (k1) of control channel BD candidates plus the second number (k2) of control channel BD candidates (k3=k1+k2). Monitoring in the second subframe can be performed when the second subframe can be within a total number of subframes of a transmission burst from the first subframe.

The terms "first OFDM symbol" and "second OFDM symbol" are used to distinguish the symbols from each other and they are not necessarily the first and the second absolute symbols in the subframe unless otherwise indicated. Similarly, the terms "first OFDM symbol position" and "second OFDM symbol position" are used to distinguish the symbols from each other and they are not necessarily the first and the second absolute symbol positions in the subframe unless otherwise indicated.

At 470, a second DCI containing a Physical Downlink Shared Channel (PDSCH) resource assignment can be decoded in at least one candidate in the third set of the third number (k3) of control channel BD candidates.

For example, a device can monitor, in a first subframe, a first set of a first number (k1) of control channel Blind Decoding (BD) candidates at an aggregation level assuming that the control channel transmission in the first subframe starts from a first OFDM symbol position (s1) in the first subframe. Then the device can monitor, in the first subframe, a second set of a second number (k2) of control channel BD candidates at the aggregation level assuming that the control channel transmission in the first subframe starts from a second OFDM symbol (s2) position in the first subframe. Then the device can determine DCI intended for the device is successfully decoded from a candidate in the second set. Then the device can monitor in a second subframe, a third set of a third number (k3) of control channel BD candidates (where k3>k1 and k3>k2) at the aggregation level assuming that the control channel transmission in the second subframe starts only from a first OFDM symbol position (s1) in the second subframe when DCI intended for the device is successfully decoded from a candidate in the second set of the second number (k2) of control channel BD candidates. The first OFDM symbol position (s1) in the first subframe can be the same position as the first OFDM symbol position (s1) in the second subframe. At 480, the flowchart 400 can end.

Figure 5:
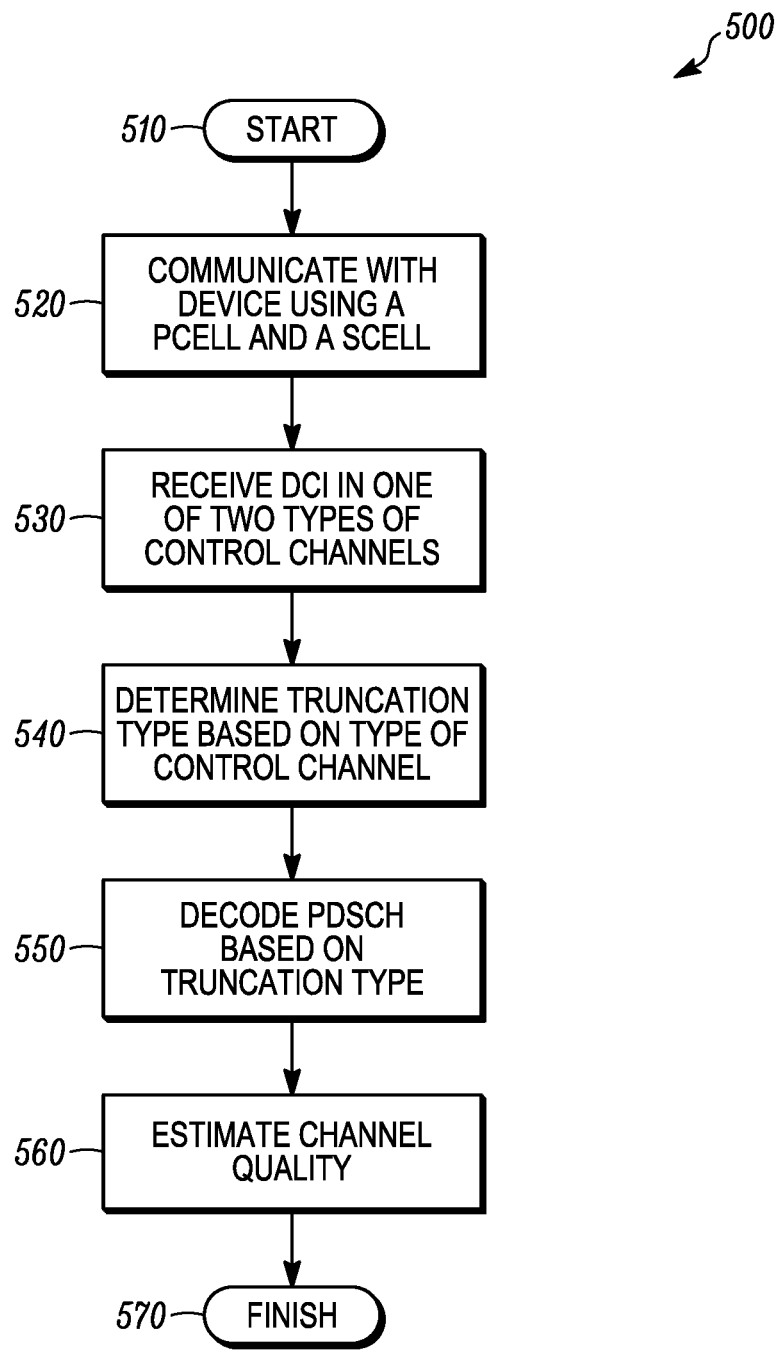
FIG. 5 is an example flowchart illustrating the operation of a wireless communication device according to a possible embodiment.

FIG. 5 is an example flowchart 500 illustrating the operation of a wireless communication device, such as the first device 110, according to a possible embodiment. At 510, the flowchart 500 can begin. At 520, the wireless communication device can communicate with a second device using a primary serving cell (Pcell) operating on a licensed carrier and a secondary serving cell (Scell) operating on an unlicensed carrier. At 530, Downlink Control Information (DCI) containing PDSCH resource assignments can be received in one of two types of control channels in a subframe. At 540, a type of truncation of the subframe can be determined based on the type of control channel on which the DCI is received.

At 550, the PDSCH can be decoded based on at least the determined type of truncation of the subframe. Decoding can also mean the device can either decode the PDSCH based on the DCI, or the device can do some processing (e.g. compute rate, SINR, etc) to make a determination if it is worth decoding the PDSCH (i.e. if it is likely the decoding will result in failure of the packet) and skip decoding the PDSCH to save some decoding complexity. The DCI can include a subframe truncation field indicating a truncation value for receiving PDSCH in the subframe and decoding can include decoding the PDSCH based on at least the determined type of truncation of the subframe and the truncation value. For example, a DCI can be received in two different types of control channel (PDCCH and EPDCCH). There can be a truncation field in the DCI. The field can be interpreted by the device in two or more different ways. Which of the interpretation to use can be discerned by the device based on the control channel in which the field was received. According to a possible implementation, the truncation value can be a number of OFDM symbols in the truncated portion of the subframe. According to another related implementation, the number of OFDM symbols can be the number of symbols by which the subframe is truncated. Decoding can also include decoding the PDSCH based on the determined type of truncation of the subframe and other information included in the DCI. For example, the other information can include a PDSCH resource assignment and other information.

According to a possible embodiment, determining at 540 can include ascertaining that the truncation is a back truncation in the subframe if the DCI is received in a PDCCH and at 560, downlink channel quality can be estimated based on reference signals in at least one of the beginning two OFDM symbols in the subframe when the truncation is a back truncation. Reference signals can be Common Reference Signals (CRS).

According to another possible embodiment, determining at 540 can include ascertaining that the truncation is a front truncation in the subframe if DCI is received in an EPDCCH and at 560 downlink channel quality can be estimated based on reference signals present in OFDM symbols other than at least one of the first two OFDM symbols of the subframe when the truncation is a front truncation. Reference signals can be CRS or Channel State Information Reference Signals (CSI-RS). According to another possible embodiment receiving 530, determining 540, and decoding 550 can be performed on the Scell. At 570, the flowchart 500 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
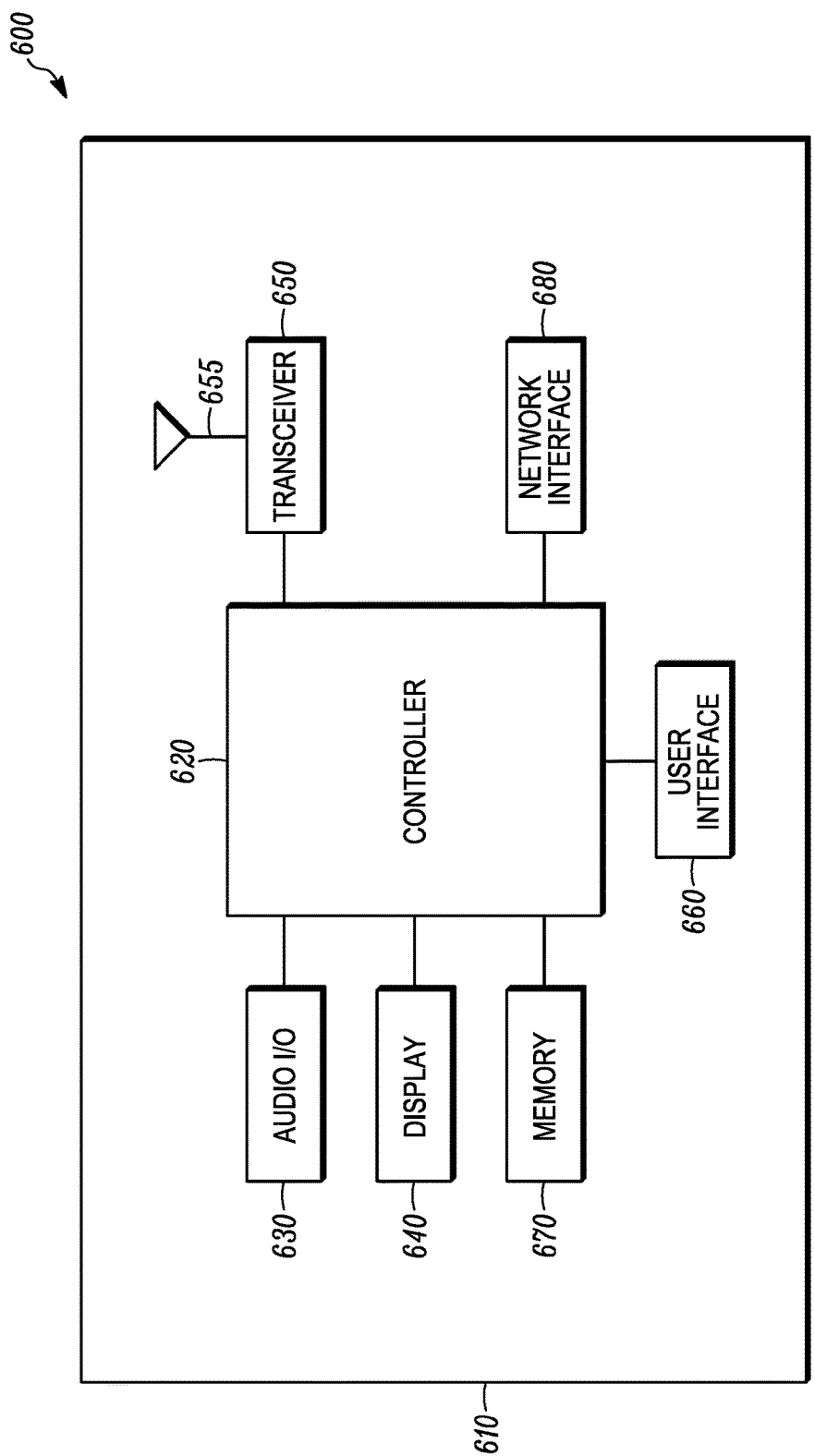
FIG. 6 is an example block diagram of an apparatus according to a possible embodiment.

FIG. 6 is an example block diagram of an apparatus 600, such as the first device 110 or the other device 112, according to a possible embodiment. The apparatus 600 can include a housing 610, a controller 620 within the housing 610, audio input and output circuitry 630 coupled to the controller 620, a display 640 coupled to the controller 620, a transceiver 650 coupled to the controller 620, an antenna 655 coupled to the transceiver 650, a user interface 660 coupled to the controller 620, a memory 670 coupled to the controller 620, and a network interface 680 coupled to the controller 620. The elements of the apparatus 600 can perform the UE and apparatus methods described in the disclosed embodiments.

The display 640 can be a viewfinder, a liquid crystal display (LCD), a light emitting diode (LED) display, a plasma display, a projection display, a touch screen, or any other device that displays information. The transceiver 650 can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a universal serial bus port, an Ethernet port, an infrared transmitter/receiver, a USB port, an IEEE 1696 port, a WLAN transceiver, or any other interface that can connect an apparatus to a network or computer and that can transmit and receive data communication signals. The memory 670 can include a random access memory, a read only memory, an optical memory, a flash memory, a removable memory, a hard drive, a cache, or any other memory that can be coupled to a wireless communication device.

The apparatus 600 and/or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 670 or elsewhere on the apparatus 600. The apparatus 600 and/or the controller 620 may also use hardware to implement disclosed operations. For example, the controller 620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an electronic device and implementing the disclosed embodiments.

In operation according to a possible embodiment, the transceiver 650 can communicate with a second apparatus using a primary serving cell (Pcell) operating on a licensed carrier and a secondary serving cell (Scell) operating on an unlicensed carrier. The controller 620 can detect a preamble transmission from the second apparatus in a first set of at least one Orthogonal Frequency Division Multiplexing (OFDM) symbol starting with a first OFDM symbol in a subframe received on the Scell, the first OFDM symbol having a first Cyclic Prefix (CP). The controller 620 can detect the preamble transmission by hypothesizing that the preamble transmission begins within a subset of OFDM symbol positions within the subframe. An end of the first OFDM symbol can be aligned with an end of OFDM symbol boundaries on the Pcell within a timing error difference.

The controller 620 can determine a second OFDM symbol in the subframe such that the second OFDM symbol immediately follows the first set of OFDM symbols. The controller 620 can decode Downlink Control Information (DCI) containing Physical Downlink Shared Channel (PDSCH) resource assignment in a second set of OFDM symbols beginning with the second OFDM symbol, the second set of OFDM symbols having a second Cyclic Prefix (CP). The duration of the first CP can be larger than the duration of the second CP. For example, the first CP can be an extended CP and the second CP can be a normal CP.

According to a possible implementation, the first set of at least one OFDM symbol can be only the first OFDM symbol. The preamble transmission can be within the first OFDM symbol with a first set of Resource Elements (RE's) of the first OFDM symbol configured for a Physical Downlink Control Channel (PDCCH) and a second set of RE's of the first OFDM symbol mapped for reference signals. A first set of RE's of the first OFDM symbol can be mapped for an Enhanced PDCCH (EPDCCH) and a second set of RE's of the first OFDM symbol can be mapped for reference signals. At least one RE of the first OFDM symbol can be mapped for at least one of the following signals: a Primary Synchronization Signal (PSS), a Secondary Synchronization Signal (SSS), a Cell-specific Reference Signal (CRS), a Discovery Signal, a Channel State Information-Reference Signal (CSI-RS), and/or an apparatus-specific reference signal.

According to another possible implementation, the subframe can be a first subframe. The preamble transmission can carry preamble information indicating a number of subsequent subframes that the second apparatus intends to transmit continuously immediately following the first subframe. The preamble information can have 4 bits indicating a total number of subframes of a transmission burst including the first subframe and subsequent subframes the second apparatus transmits continuously immediately following the first subframe. The preamble information can be encoded with a Cyclic Redundancy Check (CRC) parity code and the CRC parity bits are masked using a special identifier associated with preamble reception. The controller 620 can detect the preamble transmission by decoding downlink control information (DCI) containing preamble information in the first subframe by monitoring a maximum of a first number (N1) of control channel blind decoding candidates. The controller 620 can decode DCI containing at least one PDSCH resource assignment in the first subframe by monitoring a maximum of a second number (N2) of control channel blind decoding candidates. The controller 620 can decode DCI containing PDSCH resource assignment in a second subframe immediately following the first subframe by monitoring a maximum of a third number (N3) of control channel blind decoding candidates where the third number (N3) is greater than the second number (N2). The controller 620 can detect the preamble transmission by successfully decoding downlink control information (DCI) containing preamble information.

According to another possible embodiment, the transceiver 650 can communicate with a second apparatus, such as a base station, another device, or any other apparatus. For example, the transceiver 650 can communicate with a base station using a primary serving cell (Pcell) operating on a licensed carrier and a secondary serving cell (S cell) operating on an unlicensed carrier.

The controller 620 can monitor a first set of a first number (k1) of control channel Blind Decoding (BD) candidates in a first subframe at an aggregation level for a control channel transmission in the first subframe starting from a first OFDM symbol position (s1) in the first subframe. Monitoring can include attempting to decode and can be performed on the Scell or any other cell. The controller 620 can also monitor a second set of a second number (k2) of control channel BD candidates in the first subframe at the aggregation level for a control channel transmission in the first subframe starting from a second OFDM symbol (s2) position in the first subframe.

The controller 620 can monitor a third set of a third number (k3) of control channel BD candidates (where k3>k1 and k3>k2) in a second subframe at the aggregation level for a control channel transmission in the second subframe starting only from a first OFDM symbol position (s1) in the second subframe when a Downlink Control Information (DCI) intended for the device is successfully decoded from a candidate in the second set of the second number (k2) of control channel BD candidates. The first OFDM symbol position (s1) in the first subframe can be the same position as the first OFDM symbol position (s1) in the second subframe.

The DCI can be a first DCI. The controller 620 can successfully decode a second DCI containing a Physical Downlink Shared Channel (PDSCH) resource assignment in at least one candidate in the third set of the third number (k3) of control channel BD candidates. The third number of control channel BD candidates can be equal to the first number of control channel BD candidates plus the second number of control channel BD candidates (k3=k1+k2).

According to a possible embodiment, monitoring can be performed in the second subframe when the second subframe is within a total number of subframes of a transmission burst from the first subframe. The controller 620 can receive a transmission burst value via higher layers than a physical layer. The transmission burst value can indicate a number of subframes of the transmission burst received before the transmission of the subframes is discontinued.

According to another related embodiment, the control channel can be a PDCCH and the control channel BD candidates can be PDCCH BD candidates. According to a possible implementation, the first OFDM symbol position can be the initial OFDM symbol in the subframe and second OFDM symbol position can be an OFDM symbol whose position is an integer number of OFDM symbols later than the initial OFDM symbol in the subframe. According to another possible implementation, the first OFDM symbol position comprises the initial OFDM symbol in the subframe and the second OFDM symbol position comprises an OFDM symbol whose position is seven OFDM symbols later than the initial OFDM symbol in the subframe.

According to another related embodiment, the control channel can be an EPDCCH and the control channel BD candidates can be EPDCCH BD candidates within a first set of frequency domain resource blocks (RBs) configured by layers higher than a physical layer. According to a possible implementation, the first OFDM symbol position can be the initial OFDM symbol in the subframe and the second OFDM symbol position can be an OFDM symbol whose position is an integer number of OFDM symbols later than the initial OFDM symbol in the subframe. According to another possible implementation, the first OFDM symbol position can be the initial OFDM symbol in the subframe and the second OFDM symbol position can be an OFDM symbol whose position is four OFDM symbols later than the initial OFDM symbol in the subframe.

According to another possible embodiment, the transceiver 650 can receive Downlink Control Information (DCI) containing PDSCH resource assignments in one of two types of control channels in a subframe. The controller 620 can determine a type of truncation of the subframe based on the type of control channel on which the DCI is received and configured to decode the PDSCH based on at least the determined type of truncation of the subframe. The controller 620 can decode the PDSCH based on the determined type of truncation of the subframe and other information included in the DCI. Receiving, determining, and decoding can be performed on a Scell or any other cell.

According to a possible implementation the transceiver 650 can receive a subframe truncation field in the DCI. The subframe truncation field can indicate a truncation value for receiving PDSCH in the subframe. The controller 620 can then decode the PDSCH based on at least the determined type of truncation of the subframe and the truncation value.

According to a possible implementation, the controller 620 can determine the type of truncation by ascertaining that the truncation is a back truncation in the subframe if the DCI is received in a PDCCH. The controller 620 can then estimate a downlink channel quality based on reference signals in at least one of the beginning two OFDM symbols in the subframe.

According to a related implementation, the controller 620 can determine the type of truncation by ascertaining that the truncation is a front truncation in the subframe if DCI is received in an EPDCCH. The controller 620 can then estimate a downlink channel quality based on reference signals present in OFDM symbols other than at least one of the first two OFDM symbols of the subframe.

Figure 7:
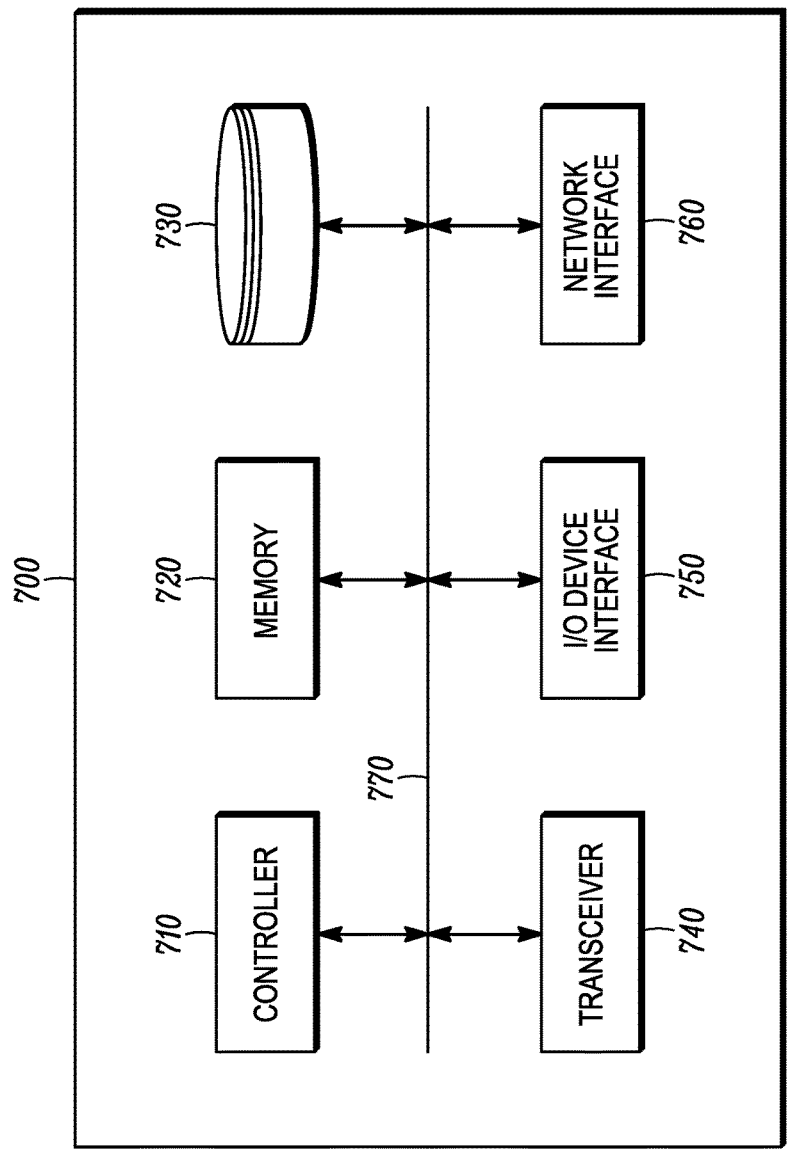
FIG. 7 is an example block diagram of a base station according to a possible embodiment.

FIG. 7 is an example block diagram of a base station 700, such as the eNB 120, according to a possible embodiment. The base station 700 may include a controller 710, a memory 720, a database interface 730, a transceiver 740, Input/Output (I/O) device interface 750, a network interface 760, and a bus 770. The base station 700 can implement any operating system, such as Microsoft Windows®, UNIX, or LINUX, for example. Base station operation software may be written in any programming language, such as C, C++, Java or Visual Basic, for example. The base station software can run on an application framework, such as, for example, a Java® server, a .NET® framework, or any other application framework.

The transceiver 740 can create a data connection with the first device 110. The controller 710 can be any programmable processor. Disclosed embodiments can also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 710 can be any controller or processor device or devices capable of operating a base station and implementing the disclosed embodiments.

The memory 720 can include volatile and nonvolatile data storage, including one or more electrical, magnetic, or optical memories, such as a Random Access Memory (RAM), cache, hard drive, or other memory device. The memory 720 can have a cache to speed access to specific data. The memory 720 can also be connected to a Compact Disc-Read Only Memory (CD-ROM), Digital Video Disc-Read Only memory (DVD-ROM), DVD read write input, tape drive, thumb drive, or other removable memory device that allows media content to be directly uploaded into a system. Data can be stored in the memory 720 or in a separate database. For example, the database interface 730 can be used by the controller 710 to access the database. The database can contain any formatting data to connect the terminal 110 to the network 130.

The I/O device interface 750 can be connected to one or more input and output devices that may include a keyboard, a mouse, a touch screen, a monitor, a microphone, a voice-recognition device, a speaker, a printer, a disk drive, or any other device or combination of devices that accept input and/or provide output. The I/O device interface 750 can receive a data task or connection criteria from a network administrator. The network connection interface 760 can be connected to a communication device, modem, network interface card, a transceiver, or any other device capable of transmitting and receiving signals to and from the network 130. The components of the base station 700 can be connected via the bus 770, may be linked wirelessly, or may be otherwise connected. The elements of the base station 700 can perform the second device, second apparatus, and/or base station operations of the disclosed embodiments.

Embodiments can provide for a method of a UE communicating with a base station using a Pcell operating on a licensed carrier and a Scell operating on an unlicensed carrier. The method can include detecting/decoding a preamble transmission in a first set of OFDM symbols starting with a first OFDM symbol in a first subframe received on the Scell by assuming that the first OFDM symbol uses an extended CP. The method can include determining a second OFDM symbol in the first subframe such that the second OFDM symbol immediately follows the first set of OFDM symbols. The method can include decoding DCI containing PDSCH resource assignments, in a second set of OFDM symbols beginning with the second OFDM symbol by assuming that the second set of OFDM symbols use a normal prefix.

The preamble transmission can be within the first OFDM symbol (i.e., the first set of OFDM symbols has only one symbol) with some RE's of the first OFDM symbol mapped for PDCCH and some other RE's of the first OFDM symbol mapped for reference signals such as CRS. The preamble transmission can be within the first OFDM symbol (i.e., the first set of OFDM symbols has only one symbol) with some RE's of the first OFDM symbol mapped for EPDCCH and some other RE's of the first OFDM symbol mapped for reference signals such as DMRS. While attempting to detect/decode the preamble transmission, the UE may assume that the preamble transmission can only begin within a subset of OFDM symbol positions within the first subframe. While attempting to detect/decode the preamble transmission, the UE can assume that the end of the first OFDM symbol is aligned with the end of the OFDM symbol boundaries on Pcell within a small timing error difference (e.g. +/−31.3 us)

The preamble transmission can carry DCI containing information, such as preamble information, indicating the number of subsequent subframes that the base station will be transmitting continuously, immediately following the first subframe. The DCI containing preamble information can have 4 bits indicating N_TX_BURST, the total number of subframes of the transmission burst (i.e., the first subframe containing the preamble and subsequent subframes that the eNB will be transmitting continuously immediately following the first subframe). The DCI containing preamble information can be CRC masked using a special identifier (e.g. a PRE-RNTI). To decode decoding DCI containing preamble information in the first subframe, the UE can monitor a maximum of N1 control channel blind decoding candidates. For example, N1=N14+N18, and N14 and N18 are the number of control channel blind decoding candidates corresponding to CCE/ECCE aggregation level 4, 8 respectively. To decode DCI containing PDSCH resource assignments in the first subframe, the UE can monitor a maximum of N2 control channel blind decoding candidates. For example, N2=N21+N24+N24 +N28, where N21, N22, N24, and N28 can be the number of control channel blind decoding candidates corresponding to CCE/ECCE aggregation levels 1, 2, 4, 8 respectively. To decode DCI containing PDSCH resource assignments in a second subframe immediately following the first subframe, the UE can monitor a maximum of N3 control channel blind decoding candidates where N3 can be greater than N2. For example, N3=N31+N34+N34+N38, where N31, N32, N34, N38 can be the number of control channel blind decoding candidates corresponding to CCE/ECCE aggregation levels 1, 2, 4, and 8 respectively.

Embodiments can also provide a method in a UE to decode DCI containing PDSCH resource assignments where the UE monitors in a first subframe, a first set of k1 control channel blind decoding (BD) candidates at aggregation level L1 assuming that the control channel transmission starts from OFDM symbol s1 and monitors in the first subframe, a second set of k2 control channel BD candidates at aggregation level L1 assuming the that control channel transmission starts from OFDM symbol s2. If DCI intended for the UE is successfully decoded form a candidate in the second set, the UE can monitor in a second subframe, a third set of k3 control channel BD candidates (where k3>k1) at aggregation level L1 assuming the that control channel transmission starts only from OFDM symbol s1. The UE can do this as long as the second subframe is within N_TX_BURST−1 subframes from the first subframe. The control channel can be PDCCH and control channel BD candidates can be PDCCH BD candidates. The control channel can be EPDCCH and control channel BD candidates can be EPDCCH BD candidates within a EPDCCH-PRB-set.

Embodiments can additionally provide a method where a UE can receive DCI containing PDSCH resource assignments in one of two types of control channels, can interpret a subframe truncation field in the received DCI based on the type of control channel on which the DCI is received, and attempt to decode data based on the interpreted subframe truncation field values and other information in the DCI. The UE can interpret that the truncation is a front truncation in a subframe if the DCI is received in the PDCCH, and the truncation is a back truncation in a subframe if DCI is received in the EPDCCH.

Although not required, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a first device, the method comprising:
   communicating, by the first device, with a second device using a primary serving cell operating on a licensed carrier and a secondary serving cell operating on an unlicensed carrier; and
   decoding downlink control information received in a first subframe on the secondary serving cell from the second device by monitoring at least one control channel blind decoding candidate at a first aggregation level and monitoring at least one control channel blind decoding candidate at a second aggregation level, where the downlink control information contains preamble information,
   wherein the preamble information indicates a subframe configuration of at least one subframe of a burst comprising the first subframe and a set of subsequent subframes immediately following the first subframe, and
   wherein the subframe configuration includes at least a special subframe with back truncation and a subframe with no truncation.

2. The method according to claim 1, wherein decoding the downlink control information further comprises decoding the downlink control information in a first set of at least one orthogonal frequency division multiplexing symbol starting with a first orthogonal frequency division multiplexing symbol in the first subframe received on the secondary serving cell.

3. The method according to claim 1, wherein the downlink control information containing preamble information is received in a physical downlink control channel.

4. The method according to claim 3, further comprising monitoring the physical downlink control channel assuming a physical downlink control channel transmission starts either in orthogonal frequency division multiplexing symbol 0 or in orthogonal frequency division multiplexing symbol 7 in the first subframe.

5. The method according to claim 1, wherein the downlink control information containing preamble information is received in a compact downlink control information format of a same size as downlink control information format 1C.

6. The method according to claim 1, wherein the preamble information is encoded with a cyclic redundancy check parity code and the cyclic redundancy check parity bits of the cyclic redundancy check parity code are masked using a special identifier associated with preamble reception.

7. The method according to claim 1, wherein the first aggregation level is control channel element-aggregation level 4, and the second aggregation level is control channel element-aggregation level 8.

8. The method according to claim 1, wherein at least one of a first number of control channel blind decoding candidate at the first aggregation level, the first aggregation level, a second number of control channel blind decoding candidate at the second aggregation level, and the second aggregation level is configured by higher layer signaling.

9. The method according to claim 1, wherein the preamble information further indicates a location of the subframes in the burst configured as uplink subframes for transmissions to the second device on the secondary serving cell.

10. The method according to claim 1, wherein the preamble information indicates a number of subframes including the first subframe and one or more subsequent subframes the second device intends to transmit continuously immediately following the first subframe.

11. The method according to claim 1, wherein the subframe configuration of the special subframe with back truncation comprises a number of orthogonal frequency division multiplexing symbols starting with a first orthogonal frequency division multiplexing symbol in the special subframe that the second device can use for transmission of physical signals or physical channels and the other symbols in the special subframe that the second device cannot use for transmission of any physical signals or physical channels .

12. The method according to claim 11, wherein the subframe configuration of the special subframe with back truncation includes indicating the number of orthogonal frequency division multiplexing symbols starting with the first orthogonal frequency division multiplexing symbol in the special subframe that the second device can use for transmission of physical signals or physical channels.

13. The method according to claim 1, wherein the subframe configuration includes a special subframe with front truncation, where the special subframe comprises a number of orthogonal frequency division multiplexing symbols starting with a first orthogonal frequency division multiplexing symbol in the special subframe that that the second device cannot use for transmission of any physical signals or physical channels and the other symbols in the special subframe that the second device can use for transmission of physical signals or physical channels.

14. The method according to claim 1, wherein the first device is a user equipment and the second device is a base station.

15. An apparatus comprising:
at least one transceiver that communicates with a second apparatus using a primary serving cell operating on a licensed carrier and a secondary serving cell operating on an unlicensed carrier; and
a controller that decodes downlink control information received in a first subframe on the secondary serving cell from the second apparatus by monitoring at least one control channel blind decoding candidate at a first aggregation level and monitoring at least one control channel blind decoding candidate at a second aggregation level, where the downlink control information contains preamble information,
wherein the preamble information indicates a subframe configuration of at least one subframe of a burst comprising the first subframe and a set of subsequent subframes immediately following the first subframe, and
wherein the subframe configuration includes at least a special subframe with back truncation and a subframe with no truncation.

16. The apparatus according to claim 15,
wherein the downlink control information containing preamble information is received in a physical downlink control channel, and
wherein the controller monitors the physical downlink control channel assuming a physical downlink control channel transmission starts either in orthogonal frequency division multiplexing symbol 0 or in orthogonal frequency division multiplexing symbol 7 in the first subframe.

17. The apparatus according to claim 15, wherein the downlink control information containing preamble information is received in a compact downlink control information format of a same size as downlink control information format 1C.

18. The apparatus according to claim 15, wherein the preamble information is encoded with a cyclic redundancy check parity code and the cyclic redundancy check parity bits of the cyclic redundancy check parity code are masked using a special identifier associated with preamble reception.

19. The apparatus according to claim 15, wherein the first aggregation level is CCE-aggregation level 4, and the second aggregation level is CCE-aggregation level 8.

20. The apparatus according to claim 15, wherein the preamble information further indicates a location of the subframes in the burst configured as uplink subframes for transmissions to the second device on the secondary serving cell.

* * * * *